(12) United States Patent
Amdahl

(10) Patent No.: US 11,223,689 B1
(45) Date of Patent: Jan. 11, 2022

(54) METHODS FOR MULTIPATH TRANSMISSION CONTROL PROTOCOL (MPTCP) BASED SESSION MIGRATION AND DEVICES THEREOF

(71) Applicant: F5 Networks, Inc., Seattle, WA (US)

(72) Inventor: Saxon Amdahl, Portola Valley, CA (US)

(73) Assignee: F5 NETWORKS, INC., Seattle, WA (US)

(*) Notice: Subject to any disclaimer, the term of this patent is extended or adjusted under 35 U.S.C. 154(b) by 0 days.

(21) Appl. No.: 16/238,127

(22) Filed: Jan. 2, 2019

Related U.S. Application Data

(60) Provisional application No. 62/613,765, filed on Jan. 5, 2018.

(51) Int. Cl.
*H04L 29/08* (2006.01)
*H04L 12/801* (2013.01)
*H04L 29/06* (2006.01)

(52) U.S. Cl.
CPC .......... *H04L 67/148* (2013.01); *H04L 47/193* (2013.01); *H04L 67/142* (2013.01); *H04L 69/14* (2013.01); *H04L 69/163* (2013.01)

(58) Field of Classification Search
CPC ... H04L 67/148; H04L 67/142; H04L 47/193; H04L 69/14; H04L 69/163
USPC .......................................................... 709/223
See application file for complete search history.

(56) References Cited

U.S. PATENT DOCUMENTS

| | | |
|---|---|---|
| 4,993,030 A | 2/1991 | Krakauer et al. |
| 5,218,695 A | 6/1993 | Noveck et al. |
| 5,282,201 A | 1/1994 | Frank et al. |
| 5,303,368 A | 4/1994 | Kotaki |
| 5,473,362 A | 12/1995 | Fitzgerald et al. |
| 5,511,177 A | 4/1996 | Kagimasa et al. |
| 5,537,585 A | 7/1996 | Blickenstaff et al. |

(Continued)

FOREIGN PATENT DOCUMENTS

| | | |
|---|---|---|
| AU | 2003300350 A1 | 7/2004 |
| CA | 2080530 A1 | 4/1994 |

(Continued)

OTHER PUBLICATIONS

Bhalla, A., et al., "Future-Proof Your Hardware Investment," F5 Networks, Inc., Aug. 16, 2018.

(Continued)

*Primary Examiner* — Tauqir Hussain
(74) *Attorney, Agent, or Firm* — Troutman Pepper Hamilton Sanders LLP (Rochester)

(57) ABSTRACT

Methods, non-transitory computer readable media, network traffic management apparatuses, and network traffic management systems that facilitates multipath transmission control protocol (MPTCP) based session migration. The primary network traffic management apparatus migrates the MPTCP session state data associated with a client-server pair flow transactions to a secondary traffic management apparatus. The primary traffic management apparatus then disconnects the first connection for the client-server pair flow transactions and the secondary traffic management apparatus establishes a second connection to continue with the processing of client-server pair flow transactions without introducing application faults.

20 Claims, 8 Drawing Sheets

(56) References Cited

U.S. PATENT DOCUMENTS

| | | |
|---|---|---|
| 5,548,724 A | 8/1996 | Akizawa et al. |
| 5,550,816 A | 8/1996 | Hardwick et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,606,665 A | 2/1997 | Yang et al. |
| 5,623,490 A | 4/1997 | Richter et al. |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,926,816 A | 7/1999 | Bauer et al. |
| 5,937,406 A | 8/1999 | Balabine et al. |
| 5,991,302 A | 11/1999 | Berl et al. |
| 5,995,491 A | 11/1999 | Richter et al. |
| 5,999,664 A | 12/1999 | Mahoney et al. |
| 6,012,083 A | 1/2000 | Savitzky et al. |
| 6,026,500 A | 2/2000 | Topff et al. |
| 6,029,168 A | 2/2000 | Frey |
| 6,029,175 A | 2/2000 | Chow et al. |
| 6,041,365 A | 3/2000 | Kleinerman |
| 6,044,367 A | 3/2000 | Wolff |
| 6,047,129 A | 4/2000 | Frye |
| 6,047,356 A | 4/2000 | Anderson et al. |
| 6,067,558 A | 5/2000 | Wendt et al. |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,104,706 A | 8/2000 | Richter et al. |
| 6,128,627 A | 10/2000 | Mattis et al. |
| 6,128,717 A | 10/2000 | Harrison et al. |
| 6,154,777 A | 11/2000 | Ebrahim |
| 6,157,950 A | 12/2000 | Krishnan |
| 6,161,145 A | 12/2000 | Bainbridge et al. |
| 6,161,185 A | 12/2000 | Guthrie et al. |
| 6,181,336 B1 | 1/2001 | Chiu et al. |
| 6,202,156 B1 | 3/2001 | Kalajan |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,259,405 B1 | 7/2001 | Stewart et al. |
| 6,260,070 B1 | 7/2001 | Shah |
| 6,282,610 B1 | 8/2001 | Bergsten |
| 6,289,345 B1 | 9/2001 | Yasue |
| 6,292,832 B1 | 9/2001 | Shah et al. |
| 6,304,913 B1 | 10/2001 | Rune |
| 6,308,162 B1 | 10/2001 | Ouimet et al. |
| 6,324,581 B1 | 11/2001 | Xu et al. |
| 6,329,985 B1 | 12/2001 | Tamer et al. |
| 6,330,226 B1 | 12/2001 | Chapman |
| 6,330,574 B1 | 12/2001 | Murashita |
| 6,338,082 B1 | 1/2002 | Schneider |
| 6,339,785 B1 | 1/2002 | Feigenbaum |
| 6,349,343 B1 | 2/2002 | Foody et al. |
| 6,353,848 B1 | 3/2002 | Morris |
| 6,363,056 B1 | 3/2002 | Beigi et al. |
| 6,370,527 B1 | 4/2002 | Singhal |
| 6,370,543 B2 | 4/2002 | Hoffert et al. |
| 6,374,263 B1 | 4/2002 | Bunger et al. |
| 6,389,433 B1 | 5/2002 | Bolosky et al. |
| 6,389,462 B1 | 5/2002 | Cohen et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,513,061 B1 | 1/2003 | Ebata et al. |
| 6,514,085 B2 | 2/2003 | Slattery et al. |
| 6,516,350 B1 | 2/2003 | Lumelsky et al. |
| 6,516,351 B2 | 2/2003 | Borr |
| 6,542,909 B1 | 4/2003 | Tamer et al. |
| 6,542,936 B1 | 4/2003 | Mayle et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,578,069 B1 | 6/2003 | Hopmann et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,615,267 B1 | 9/2003 | Whalen et al. |
| 6,654,346 B1 | 11/2003 | Mahalingaiah et al. |
| 6,701,415 B1 | 3/2004 | Hendren, III |
| 6,708,220 B1 | 3/2004 | Olin |
| 6,721,794 B2 | 4/2004 | Taylor et al. |
| 6,728,265 B1 | 4/2004 | Yavatkar et al. |
| 6,728,704 B2 | 4/2004 | Mao et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,744,776 B1 | 6/2004 | Kalkunte et al. |
| 6,748,420 B1 | 6/2004 | Quatrano et al. |
| 6,754,215 B1 | 6/2004 | Arikawa et al. |
| 6,754,699 B2 | 6/2004 | Swildens et al. |
| 6,757,706 B1 | 6/2004 | Dong et al. |
| 6,760,337 B1 | 7/2004 | Snyder, II et al. |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,795,860 B1 | 9/2004 | Shah |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,865,593 B1 | 3/2005 | Reshef et al. |
| 6,868,447 B1 | 3/2005 | Slaughter et al. |
| 6,871,221 B1 | 3/2005 | Styles |
| 6,871,245 B2 | 3/2005 | Bradley |
| 6,880,017 B1 | 4/2005 | Marce et al. |
| 6,883,137 B1 | 4/2005 | Girardot et al. |
| 6,889,249 B2 | 5/2005 | Miloushev et al. |
| 6,914,881 B1 | 7/2005 | Mansfield et al. |
| 6,922,688 B1 | 7/2005 | Frey, Jr. |
| 6,928,518 B2 | 8/2005 | Talagala |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,970,475 B1 | 11/2005 | Fraser et al. |
| 6,970,924 B1 | 11/2005 | Chu et al. |
| 6,973,455 B1 | 12/2005 | Vahalia et al. |
| 6,973,490 B1 | 12/2005 | Robertson et al. |
| 6,973,549 B1 | 12/2005 | Testardi |
| 6,975,592 B1 | 12/2005 | Sedddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,074 B2 | 1/2006 | Wan et al. |

(56) References Cited

U.S. PATENT DOCUMENTS

| | | |
|---|---|---|
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 6,999,912 B2 | 2/2006 | Loisey et al. |
| 7,003,533 B2 | 2/2006 | Noguchi et al. |
| 7,003,564 B2 | 2/2006 | Greuel et al. |
| 7,006,981 B2 | 2/2006 | Rose et al. |
| 7,039,061 B2 | 2/2006 | Connor et al. |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | McCann et al. |
| 7,023,974 B1 | 4/2006 | Brannam et al. |
| 7,024,427 B2 | 4/2006 | Bobbitt et al. |
| 7,035,212 B1 | 4/2006 | Mittal et al. |
| 7,051,112 B2 | 5/2006 | Dawson |
| 7,054,998 B2 | 5/2006 | Arnott et al. |
| 7,055,010 B2 | 5/2006 | Lin et al. |
| 7,065,482 B2 | 6/2006 | Shorey et al. |
| 7,072,917 B2 | 7/2006 | Wong et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,286 B1 | 8/2006 | Malik |
| 7,089,491 B2 | 8/2006 | Feinberg et al. |
| 7,111,115 B2 | 9/2006 | Peters et al. |
| 7,113,962 B1 | 9/2006 | Kee et al. |
| 7,113,996 B2 | 9/2006 | Kronenberg |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,863 B2 | 11/2006 | Teng et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,181,523 B2 | 2/2007 | Sim |
| 7,191,163 B2 | 3/2007 | Herrera et al. |
| 7,194,579 B2 | 3/2007 | Robinson et al. |
| 7,228,359 B1 | 6/2007 | Monteiro |
| 7,234,074 B2 | 6/2007 | Cohn et al. |
| 7,236,491 B2 | 6/2007 | Tsao et al. |
| 7,240,100 B1 | 7/2007 | Wein et al. |
| 7,243,089 B2 | 7/2007 | Becker-Szendy et al. |
| 7,243,094 B2 | 7/2007 | Tabellion et al. |
| 7,263,610 B2 | 8/2007 | Parker et al. |
| 7,269,168 B2 | 9/2007 | Roy et al. |
| 7,269,582 B2 | 9/2007 | Winter et al. |
| 7,272,613 B2 | 9/2007 | Sim et al. |
| 7,280,536 B2 | 10/2007 | Testardi |
| 7,284,150 B2 | 10/2007 | Ma et al. |
| 7,292,541 B1 | 11/2007 | C S |
| 7,293,097 B2 | 11/2007 | Borr |
| 7,293,099 B1 | 11/2007 | Kalajan |
| 7,293,133 B1 | 11/2007 | Colgrove et al. |
| 7,296,263 B1 | 11/2007 | Jacob |
| 7,299,250 B2 | 11/2007 | Douceur et al. |
| 7,308,475 B1 | 12/2007 | Pruitt et al. |
| 7,324,533 B1 | 1/2008 | DeLiberato et al. |
| 7,330,486 B2 | 2/2008 | Ko et al. |
| 7,340,571 B2 | 3/2008 | Saze |
| 7,343,398 B1 | 3/2008 | Lownsbrough |
| 7,346,664 B2 | 3/2008 | Wong et al. |
| 7,373,438 B1 | 5/2008 | DeBergalis et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,409,440 B1 | 8/2008 | Jacob |
| 7,415,488 B1 | 8/2008 | Muth et al. |
| 7,415,608 B2 | 8/2008 | Bolosky et al. |
| 7,418,439 B2 | 8/2008 | Wong |
| 7,437,358 B2 | 10/2008 | Arrouye et al. |
| 7,440,982 B2 | 10/2008 | Lu et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,532,577 B2 | 5/2009 | Park |
| 7,562,110 B2 | 7/2009 | Miloushev et al. |
| 7,571,168 B2 | 8/2009 | Bahar et al. |
| 7,574,433 B2 | 8/2009 | Engel |
| 7,577,723 B2 | 8/2009 | Matsuda et al. |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,639,883 B2 | 12/2009 | Gill |
| 7,640,347 B1 | 12/2009 | Sloat et al. |
| 7,644,109 B2 | 1/2010 | Manley et al. |
| 7,653,699 B1 | 1/2010 | Colgrove et al. |
| 7,656,788 B2 | 2/2010 | Ma et al. |
| 7,684,423 B2 | 3/2010 | Tripathi et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,698,458 B1 | 4/2010 | Lui et al. |
| 7,711,771 B2 | 5/2010 | Kirnos |
| 7,734,603 B1 | 6/2010 | McManis |
| 7,739,540 B2 | 6/2010 | Akutsu et al. |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,788,335 B2 | 8/2010 | Miloushev et al. |
| 7,809,691 B1 | 10/2010 | Karmarkar et al. |
| 7,822,839 B1 | 10/2010 | Pruitt et al. |
| 7,822,939 B1 | 10/2010 | Veprinsky et al. |
| 7,831,639 B1 | 11/2010 | Panchbudhe et al. |
| 7,849,112 B2 | 12/2010 | Mane et al. |
| 7,853,958 B2 | 12/2010 | Matthew et al. |
| 7,861,085 B1 | 12/2010 | Case et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,886,218 B2 | 2/2011 | Watson |
| 7,895,653 B2 | 2/2011 | Calo et al. |
| 7,900,002 B2 | 3/2011 | Lyon |
| 7,903,554 B1 | 3/2011 | Manur et al. |
| 7,904,466 B1 | 3/2011 | Valencia et al. |
| 7,908,245 B2 | 3/2011 | Nakano et al. |
| 7,913,053 B1 | 3/2011 | Newland |
| 7,953,085 B2 | 5/2011 | Chang et al. |
| 7,953,701 B2 | 5/2011 | Okitsu et al. |
| 7,958,222 B1 | 6/2011 | Pruitt et al. |
| 7,958,347 B1 | 6/2011 | Ferguson |
| 7,984,500 B1 | 7/2011 | Khanna et al. |
| 8,005,953 B2 | 8/2011 | Miloushev et al. |
| 8,015,157 B2 | 9/2011 | Kamei et al. |
| 8,024,443 B1 | 9/2011 | Jacob |
| 8,046,547 B1 | 10/2011 | Chatterjee et al. |
| 8,055,724 B2 | 11/2011 | Amegadzie et al. |
| 8,064,342 B2 | 11/2011 | Badger |
| 8,069,225 B2 | 11/2011 | McCanne et al. |
| 8,099,758 B2 | 1/2012 | Schaefer et al. |
| 8,103,622 B1 | 1/2012 | Karinta |
| 8,112,392 B1 | 2/2012 | Bunnell et al. |
| 8,117,244 B2 | 2/2012 | Marinov et al. |
| 8,155,128 B2 | 4/2012 | Balyan et al. |
| 8,171,124 B2 | 5/2012 | Kondamuru |
| 8,190,769 B1 | 5/2012 | Shukla et al. |
| 8,209,403 B2 | 6/2012 | Szabo et al. |
| 8,271,751 B2 | 9/2012 | Hinrichs, Jr. |
| 8,302,100 B2 | 10/2012 | Deng et al. |
| 8,326,798 B1 | 12/2012 | Driscoll et al. |

(56) References Cited

U.S. PATENT DOCUMENTS

| | | |
|---|---|---|
| 8,351,600 B2 | 1/2013 | Resch |
| 8,396,836 B1 | 3/2013 | Ferguson et al. |
| 8,463,850 B1 | 6/2013 | McCann |
| 8,484,348 B2 | 7/2013 | Subramanian et al. |
| 8,559,313 B1 | 10/2013 | Mukerji |
| 8,560,693 B1 | 10/2013 | Wang et al. |
| 8,601,000 B1 | 12/2013 | Stefani et al. |
| 10,476,809 B1 * | 11/2019 | Daniel ............... G06F 9/45558 |
| 10,659,475 B2 * | 5/2020 | Lazri .................... G06F 21/552 |
| 10,795,707 B2 * | 10/2020 | Hay ..................... G06F 21/566 |
| 2001/0003164 A1 | 6/2001 | Murakami |
| 2001/0007560 A1 | 7/2001 | Masuda et al. |
| 2001/0047293 A1 | 11/2001 | Waller et al. |
| 2002/0012352 A1 | 1/2002 | Hansson et al. |
| 2002/0012382 A1 | 1/2002 | Schilling |
| 2002/0035537 A1 | 3/2002 | Waller et al. |
| 2002/0038360 A1 | 3/2002 | Andrews et al. |
| 2002/0059263 A1 | 5/2002 | Shima et al. |
| 2002/0065848 A1 | 5/2002 | Walker et al. |
| 2002/0072048 A1 | 6/2002 | Slattery et al. |
| 2002/0087571 A1 | 7/2002 | Stapel et al. |
| 2002/0087744 A1 | 7/2002 | Kitchin |
| 2002/0087887 A1 | 7/2002 | Busam et al. |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0106263 A1 | 8/2002 | Winker |
| 2002/0120727 A1 | 8/2002 | Curley |
| 2002/0120763 A1 | 8/2002 | Miloushev et al. |
| 2002/0143819 A1 | 10/2002 | Han et al. |
| 2002/0143852 A1 | 10/2002 | Guo et al. |
| 2002/0143892 A1 | 10/2002 | Mogul |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0162118 A1 | 10/2002 | Levy et al. |
| 2002/0174216 A1 | 11/2002 | Shorey et al. |
| 2002/0194112 A1 | 12/2002 | dePinto et al. |
| 2002/0194342 A1 | 12/2002 | Lu et al. |
| 2002/0198956 A1 | 12/2002 | Dunshea et al. |
| 2003/0005172 A1 | 1/2003 | Chessell |
| 2003/0009528 A1 | 1/2003 | Sharif et al. |
| 2003/0012382 A1 | 1/2003 | Ferchichi et al. |
| 2003/0018450 A1 | 1/2003 | Carley |
| 2003/0018585 A1 | 1/2003 | Butler et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0034905 A1 | 2/2003 | Anton et al. |
| 2003/0051045 A1 | 3/2003 | Connor |
| 2003/0055723 A1 | 3/2003 | English |
| 2003/0065956 A1 | 4/2003 | Belapurkar et al. |
| 2003/0074301 A1 | 4/2003 | Solomon |
| 2003/0105846 A1 | 6/2003 | Zhao et al. |
| 2003/0108000 A1 | 6/2003 | Chaney et al. |
| 2003/0108002 A1 | 6/2003 | Chaney et al. |
| 2003/0128708 A1 | 7/2003 | Inoue et al. |
| 2003/0130945 A1 | 7/2003 | Force et al. |
| 2003/0139934 A1 | 7/2003 | Mandera |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0200207 A1 | 10/2003 | Dickinson |
| 2003/0204635 A1 | 10/2003 | Ko et al. |
| 2003/0212954 A1 | 11/2003 | Patrudu |
| 2003/0220835 A1 | 11/2003 | Barnes, Jr. |
| 2003/0229665 A1 | 12/2003 | Ryman |
| 2003/0236995 A1 | 12/2003 | Fretwell, Jr. |
| 2004/0003266 A1 | 1/2004 | Moshir et al. |
| 2004/0006575 A1 | 1/2004 | Visharam et al. |
| 2004/0006591 A1 | 1/2004 | Matsui et al. |
| 2004/0010654 A1 | 1/2004 | Yasuda et al. |
| 2004/0015783 A1 | 1/2004 | Lennon et al. |
| 2004/0017825 A1 | 1/2004 | Stanwood et al. |
| 2004/0028043 A1 | 2/2004 | Maveli et al. |
| 2004/0030627 A1 | 2/2004 | Sedukhin |
| 2004/0030740 A1 | 2/2004 | Stelting |
| 2004/0030857 A1 | 2/2004 | Krakirian et al. |
| 2004/0043758 A1 | 3/2004 | Sorvari et al. |
| 2004/0044705 A1 | 3/2004 | Stager et al. |
| 2004/0054748 A1 | 3/2004 | Ackaouy et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0093361 A1 | 5/2004 | Therrien et al. |
| 2004/0098595 A1 | 5/2004 | Aupperle et al. |
| 2004/0122926 A1 | 6/2004 | Moore et al. |
| 2004/0123277 A1 | 6/2004 | Schrader et al. |
| 2004/0133577 A1 | 7/2004 | Miloushev et al. |
| 2004/0133605 A1 | 7/2004 | Chang et al. |
| 2004/0133606 A1 | 7/2004 | Miloushev et al. |
| 2004/0138858 A1 | 7/2004 | Carley |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0167967 A1 | 8/2004 | Bastian et al. |
| 2004/0199547 A1 | 10/2004 | Winter et al. |
| 2004/0213156 A1 | 10/2004 | Smallwood et al. |
| 2004/0215665 A1 | 10/2004 | Edgar et al. |
| 2004/0236798 A1 | 11/2004 | Srinivasan et al. |
| 2004/0236826 A1 | 11/2004 | Harville et al. |
| 2005/0008017 A1 | 1/2005 | Datta et al. |
| 2005/0021703 A1 | 1/2005 | Cherry et al. |
| 2005/0027841 A1 | 2/2005 | Rolfe |
| 2005/0027862 A1 | 2/2005 | Nguyen et al. |
| 2005/0044158 A1 | 2/2005 | Malik |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0165656 A1 | 7/2005 | Frederick et al. |
| 2005/0174944 A1 | 8/2005 | Legault et al. |
| 2005/0175013 A1 | 8/2005 | Permec et al. |
| 2005/0180419 A1 | 8/2005 | Park |
| 2005/0187866 A1 | 8/2005 | Lee |
| 2005/0198234 A1 | 9/2005 | Leib et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0256806 A1 | 11/2005 | Tien et al. |
| 2005/0198501 A1 | 12/2005 | Andreev et al. |
| 2005/0273456 A1 | 12/2005 | Revanuru et al. |
| 2005/0289111 A1 | 12/2005 | Tribble et al. |
| 2006/0010502 A1 | 1/2006 | Mimatsu et al. |
| 2006/0031374 A1 | 2/2006 | Lu et al. |
| 2006/0031778 A1 | 2/2006 | Goodwin et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0100752 A1 | 5/2006 | Kim et al. |
| 2006/0106882 A1 | 5/2006 | Douceur et al. |
| 2006/0112367 A1 | 5/2006 | Harris |
| 2006/0123062 A1 | 6/2006 | Bobbitt et al. |
| 2006/0123210 A1 | 6/2006 | Pritchett et al. |
| 2006/0130133 A1 | 6/2006 | Andreev et al. |
| 2006/0140193 A1 | 6/2006 | Kakan, I et al. |
| 2006/0153201 A1 | 7/2006 | Hepper et al. |
| 2006/0167838 A1 | 7/2006 | Lacapra |
| 2006/0184589 A1 | 8/2006 | Lees et al. |
| 2006/0198300 A1 | 9/2006 | Li |
| 2006/0200470 A1 | 9/2006 | Lacapra et al. |

(56) References Cited

U.S. PATENT DOCUMENTS

| | | |
|---|---|---|
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0235998 A1 | 10/2006 | Stecher et al. |
| 2006/0259320 A1 | 11/2006 | LaSalle et al. |
| 2006/0268692 A1 | 11/2006 | Wright et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282442 A1 | 12/2006 | Lennon et al. |
| 2006/0282461 A1 | 12/2006 | Marinescu |
| 2006/0282471 A1 | 12/2006 | Mark et al. |
| 2007/0005807 A1 | 1/2007 | Wong |
| 2007/0016613 A1 | 1/2007 | Foresti et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0038994 A1 | 2/2007 | Davis et al. |
| 2007/0061441 A1 | 3/2007 | Landis et al. |
| 2007/0088702 A1 | 4/2007 | Fridella et al. |
| 2007/0112775 A1 | 5/2007 | Ackerman |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0136308 A1 | 6/2007 | Tsirigotis et al. |
| 2007/0139227 A1 | 6/2007 | Speirs, II et al. |
| 2007/0162891 A1 | 7/2007 | Burner et al. |
| 2007/0168320 A1 | 7/2007 | Borthakur et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0233826 A1 | 10/2007 | Tindal et al. |
| 2007/0250560 A1 | 10/2007 | Wein et al. |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0046432 A1 | 2/2008 | Anderson et al. |
| 2008/0070575 A1 | 3/2008 | Claussen et al. |
| 2008/0114718 A1 | 5/2008 | Anderson et al. |
| 2008/0183888 A1 | 7/2008 | Brown |
| 2008/0189468 A1 | 8/2008 | Schmidt et al. |
| 2008/0208917 A1 | 8/2008 | Smoot et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0263401 A1 | 10/2008 | Stenzel |
| 2008/0270578 A1 | 10/2008 | Zhang et al. |
| 2008/0281908 A1 | 11/2008 | McCanne et al. |
| 2008/0282047 A1 | 11/2008 | Arakawa et al. |
| 2008/0294446 A1 | 11/2008 | Guo et al. |
| 2008/0298233 A1 | 12/2008 | Arora |
| 2009/0007162 A1 | 1/2009 | Sheehan |
| 2009/0019535 A1 | 1/2009 | Mishra et al. |
| 2009/0037975 A1 | 2/2009 | Ishikawa et al. |
| 2009/0041230 A1 | 2/2009 | Williams |
| 2009/0055507 A1 | 2/2009 | Oeda |
| 2009/0055607 A1 | 2/2009 | Schack et al. |
| 2009/0077097 A1 | 3/2009 | Lacapra et al. |
| 2009/0080440 A1 | 3/2009 | Balyan et al. |
| 2009/0089344 A1 | 4/2009 | Brown et al. |
| 2009/0094252 A1 | 4/2009 | Wong et al. |
| 2009/0094311 A1 | 4/2009 | Awadallah et al. |
| 2009/0106255 A1 | 4/2009 | Lacapra et al. |
| 2009/0106263 A1 | 4/2009 | Khalid et al. |
| 2009/0106413 A1 | 4/2009 | Salo et al. |
| 2009/0125955 A1 | 5/2009 | DeLorme |
| 2009/0132616 A1 | 5/2009 | Winter et al. |
| 2009/0138314 A1 | 5/2009 | Bruce |
| 2009/0161542 A1 | 6/2009 | Ho |
| 2009/0185497 A1 | 7/2009 | Arora |
| 2009/0187915 A1 | 7/2009 | Chew et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0217163 A1 | 8/2009 | Jaroker |
| 2009/0217386 A1 | 8/2009 | Schneider |
| 2009/0240705 A1 | 9/2009 | Miloushev et al. |
| 2009/0240899 A1 | 9/2009 | Akagawa et al. |
| 2009/0241176 A1 | 9/2009 | Beletski et al. |
| 2009/0265396 A1 | 10/2009 | Ram et al. |
| 2009/0265467 A1 | 10/2009 | Peles |
| 2009/0292957 A1 | 11/2009 | Bower et al. |
| 2009/0300161 A1 | 12/2009 | Pruitt et al. |
| 2009/0316708 A1 | 12/2009 | Yahyaoui et al. |
| 2009/0319600 A1 | 12/2009 | Sedan et al. |
| 2010/0017643 A1 | 1/2010 | Baba et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0082542 A1 | 4/2010 | Feng et al. |
| 2010/0093318 A1 | 4/2010 | Zhu et al. |
| 2010/0103819 A1 | 4/2010 | Samuels |
| 2010/0131654 A1 | 5/2010 | Malakapalli et al. |
| 2010/0179984 A1 | 7/2010 | Sebastian |
| 2010/0205206 A1 | 8/2010 | Rabines et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0274772 A1 | 10/2010 | Samuels |
| 2010/0306169 A1 | 12/2010 | Pishevar et al. |
| 2010/0325257 A1 | 12/2010 | Goel et al. |
| 2010/0325634 A1 | 12/2010 | Ichikawa et al. |
| 2011/0055921 A1 | 3/2011 | Narayanaswamy et al. |
| 2011/0066736 A1 | 3/2011 | Mitchell et al. |
| 2011/0072321 A1 | 3/2011 | Dhuse |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0107112 A1 | 5/2011 | Resch |
| 2011/0119234 A1 | 5/2011 | Schack et al. |
| 2011/0185082 A1 | 7/2011 | Thompson |
| 2011/0296411 A1 | 12/2011 | Teng et al. |
| 2011/0320882 A1 | 12/2011 | Beaty et al. |
| 2012/0007239 A1 | 3/2012 | Agarwal et al. |
| 2012/0117028 A1 | 5/2012 | Gold et al. |
| 2012/0144229 A1 | 6/2012 | Nadolski |
| 2012/0150699 A1 | 6/2012 | Trapp et al. |
| 2012/0150805 A1 | 6/2012 | Pafumi et al. |
| 2013/0058229 A1 | 3/2013 | Casado et al. |
| 2013/0058252 A1 | 3/2013 | Casado et al. |
| 2013/0058255 A1 | 3/2013 | Casado et al. |
| 2013/0074181 A1* | 3/2013 | Singh .................. H04L 67/10 726/22 |
| 2013/0086142 A1* | 4/2013 | Hampel ............... H04L 67/148 709/203 |
| 2014/0143308 A1 | 5/2014 | Tychina |
| 2014/0223556 A1* | 8/2014 | Bignon ............... H04L 63/1441 726/22 |
| 2015/0281367 A1* | 10/2015 | Nygren ................ H04L 47/193 709/228 |
| 2015/0282219 A1* | 10/2015 | Kweon .................. H04W 76/12 370/235 |
| 2016/0140045 A1 | 5/2016 | Bergeron |
| 2017/0339219 A1* | 11/2017 | Le ......................... H04L 69/163 |
| 2019/0150150 A1* | 5/2019 | Calin ................... H04L 43/0811 370/329 |
| 2019/0182367 A1 | 6/2019 | Kim |

FOREIGN PATENT DOCUMENTS

| | | |
|---|---|---|
| CA | 2512312 A1 | 7/2004 |
| EP | 0605088 A2 | 7/1996 |
| EP | 0 738 970 A1 | 10/1996 |
| EP | 1081918 A2 | 7/2001 |
| JP | 63010250 A | 1/1988 |
| JP | 6205006 A | 7/1994 |
| JP | 06-332782 | 12/1994 |
| JP | 8021924 B | 3/1996 |

(56) References Cited

FOREIGN PATENT DOCUMENTS

| | | |
|---|---|---|
| JP | 08-328760 | 12/1996 |
| JP | 08-339355 | 12/1996 |
| JP | 9016510 A | 1/1997 |
| JP | 11282741 A | 10/1999 |
| JP | 2000-183935 A | 6/2000 |
| NZ | 566291 A | 12/2008 |
| WO | WO 0058870 A2 | 10/2000 |
| WO | WO 02/39696 A2 | 5/2002 |
| WO | WO 02/056181 A2 | 7/2002 |
| WO | WO 2004/061605 A2 | 7/2004 |
| WO | WO 2006/091040 A1 | 8/2006 |
| WO | WO 2008/130983 A1 | 10/2008 |
| WO | WO 2008/147973 A2 | 12/2008 |

OTHER PUBLICATIONS

"Software-Defined Hardware: Enabling Performance and Agility with the BIG-IP iSeries Architecture," F5 Networks, Inc., Nov. 11, 2016.

F5 Networks, Inc., "BIG-IP® Local Traffic Management: Basics", Manual, May 9, 2016, 58 pages, version 12.1, F5 Networks, Inc.

F5 Networks, Inc., "F5 BIG-IP TMOS: Operations Guide", Manual, Dec. 2018, 226 pages, F5 Networks, Inc.

F5 Networks, Inc., "BIG-IP® Local Traffic Manager™: Implementations", Manual, May 4, 2018, 228 pages, version 12.1, F5 Networks, Inc.

F5 Networks, Inc., "BIG-IP® Tmos:® Implementations", Manual, May 9, 2016, 184 pages, version 12.1, F5 Networks, Inc.

F5 Networks Inc., "BIG-IP® Local Traffic Manager™: Implementations", Manual, May 25, 2016, pp. 1-284, vol. 12.0, F5 Networks, Inc., Retrieved from the Internet:<https://support.f5.com/kb/en-US/products/big-ip_ltm/manuals/product/ltm-implementations-12-0-0.html>.

F5 Networks Inc., "F5 BIG-IP TMOS: Operations Guide", Manual, Mar. 5, 2016, pp. 1-236, F5 Networks, Inc., Retrieved from the Internet:<https://support.f5.com/kb/en-US/products/big-ip_ltm/manuals/product/f5-tmos-operations-guide.html>.

F5 Networks Inc., "BIG-IP® Local Traffic Management: Basics", Manual, Oct. 20, 2015, pp. 1-68, vol. 12.0, F5 Networks, Inc., Retrieved from the Internet:<https://support.f5.com/kb/en-us/products/big-ip_ltm/manuals/product/ltm-basics-12-0-0.html>.

F5 Networks Inc., "BIG-IP LTM and TMOS 12.0.0", Release Notes, Oct. 6, 2016, pp. 1-110, vol. 12.0, F5 Networks, Inc., Retrieved from the Internet:<https://support.f5.com/kb/en-US/products/big-ip_ltm/releasenotes/product/relnote-ltm-12-0-0.html>.

F5 Networks Inc., "BIG-IP® Analytics: Implementations", Manual, Oct. 27, 2015, pp. 1-50, vol. 12.0, F5 Networks, Inc., Retrieved from the Internet:<https://support.f5.com/kb/en-US/products/big-ip_ltm/manuals/product/ltm-basics-12-0-0.html>.

"A Storage Architecture Guide," Second Edition, 2001, Auspex Systems, Inc., www.auspex.com, last accessed on Dec. 30, 2002.

"CSA Persistent File System Technology," A White Paper, Jan. 1, 1999, pp. 1-3, http://www.cosoa.com/white_papers/pfs.php, Colorado Software Architecture, Inc.

"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

"Market Research & Releases, CMPP PoC documentation", last accessed Mar. 29, 2010, (http://mainstreet/sites/PD/Teams/ProdMgmt/MarketResearch/Universal).

"Market Research & Releases, Solstice Diameter Requirements", last accessed Mar. 29, 2010, (http://mainstreet/sites/PD/Teams/ProdMgmt/MarketResearch/Unisversal).

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002, 9 pages.

"Respond to server depending on TCP: :client_port", DevCentral Forums iRules, pp. 1-6, last accessed Mar. 26, 2010, (http://devcentral.f5.com/Default/aspx?tabid=53&forumid=5&tpage=1&v).

"Scaling Next Generation Web Infrastructure with Content-Intelligent Switching: White Paper," Apr. 2000, pp. 1-9, Alteon Web Systems, Inc.

"The AFS File System in Distributed Computing Environment," www.transarc.ibm.com/Libraiy/whitepapers/AFS/afsoverview.html, last accessed on Dec. 20, 2002.

"Veritas SanPoint Foundation Suite(tm) and SANPoint Foundation Suite(tm) HA: New Veritas Volume Management and File System Technology for Cluster Environments," Sep. 2001, 26 pages, Veritas Software Corp.

"Windows Clustering Technologies-An Overview," Nov. 2001, 31 pages, Microsoft Corp.

Aguilera et al., "Improving recoverability in multi-tier storage systems," International Conference on Dependable Systems and Networks (DSN-2007), Jun. 2007, 10 pages, Edinburgh, Scotland.

Anderson et al., "Interposed Request Routing for Scalable Network Storage," ACM Transactions on Computer Systems 20(1): (Feb. 2002), pp. 1-24.

Anderson et al., "Serverless Network File System," in the 15th Symposium on Operating Systems Principles, Dec. 1995, 18 pages, Association for Computing Machinery, Inc.

Anonymous, "How DFS Works: Remote File Systems," Distributed File System (DFS) Mar. 2003, 54 pages, Technical Reference retrieved from the Internet on Jan. 29, 2010, URL<http://technetmicrosoft.com/en-us/library/cc782417(WS. 10,printer).aspx>.

Apple, Inc., "Mac OS X Tiger Keynote Intro. Part 2," Jun. 2004, www.youtube.com <http://www.youtube.com/watch?v=zSBJwEmRJbY>, 1 page.

Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-11.

Baer, T., et al., "The elements of Web services" ADTmag.com, Dec. 2002, pp. 1-6, (http://www.adtmag.com).

Basney et al., "Credential Wallets: A Classification of Credential Repositories Highlighting MyProxy," Sep. 19-21, 2003, pp. 1-20, $31^{st}$ Research Conference on Communication, Information and Internet Policy (TPRC 2003), Arlington, Virginia.

Blue Coat, "Technology Primer: CIFS Protocol Optimization," Blue Coat Systems Inc., 2007, pp. 1-3, (http://www.bluecoat.com).

Botzum, Keys, "Single Sign On—A Contrarian View," Aug. 6, 2001, pp. 1-8, Open Group Website, http://www.opengroup.org/security/topics.htm.

Cabrera et al., "Swift: A Storage Architecture for Large Objects," In Proceedings of the-Eleventh IEEE Symposium on Mass Storage Systems, Oct. 1991, pp. 1-7.

Cabrera et al., "Swift: Using Distributed Disk Striping to Provide High I/O Data Rates," Fall 1991, pp. 405-436, vol. 4, No. 4, Computing Systems.

Cabrera et al., "Using Data Striping in a Local Area Network," 1992, 22 pages, Technical report No. UCSC-CRL-92-09 of the Computer & Information Sciences Department of University of California at Santa Cruz.

Callaghan et al., "NFS Version 3 Protocol Specifications" (RFC 1813), Jun. 1995, 127 pages, The Internet Engineering Task Force (IE1N.

Carns et al., "PVFS: A Parallel File System For Linux Clusters," in Proceedings of the Extreme Linux Track: 4th Annual Linux Showcase and Conference, Oct. 2000, pp. 317-327, Atlanta, Georgia, USENIX Association.

Cavale, M. R., "Introducing Microsoft Cluster Service (MSCS) in the Windows Server 2003", Nov. 2002, 10 pages, Microsoft Corporation.

English Translation of Notification of Reason(s) for Refusal for JP 2002-556371 (DispatchDate: Jan. 22, 2007).

F5 Networks Inc., "3-DNS® Reference Guide, version 4.5", F5 Networks Inc., Sep. 2002, pp. 2-1 -2-28, 3-1 -3-12, 5-1 -5-24, Seattle, Washington.

(56) References Cited

OTHER PUBLICATIONS

F5 Networks Inc., "Big-IP® Reference Guide, version 4.5", F5 Networks Inc., Sep. 2002, pp. 11-1-11-32, Seattle, Washington.
F5 Networks Inc., "Case Information Log for 'Issues withBoNY upgrade to 4.3'", as early as Feb. 2008.
F5 Networks Inc., "Deploying the BIG-IP LTM for Diameter Traffic Management," F5® Deployment Guide, Publication date Sep. 2010, Version 1.2, pp. 1-19.
F5 Networks Inc., "F5 Diameter RM", Powerpoint document, Jul. 16, 2009, pp. 1-7.
F5 Networks Inc., "F5 WANJet CIFS Acceleration", White Paper, F5 Networks Inc., Mar. 2006, pp. 1-5, Seattle, Washington.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Using F5's-DNS Controller To Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
Fajardo V., "Open Diameter Software Architecture," Jun. 25, 2004, pp. 1-6, Version 1.0.7.
Fan et al., "Summary Cache: A Scalable Wide-Area Protocol", Computer Communications Review, Association Machinery, New York, USA, Oct. 1998, pp. 254-265, vol. 28, Web Cache Sharing for Computing No. 4.
Farley, M., "Enterprise Storage Forum," Jan. 2000, 2 pages, Book Review-Building Storage Networks, $2^{nd}$ Edition, http://www.enterprisestorageforum.com/sans/features/print/0,,10556_1441201.00.html, Enterprise Storage Forum Staff, last accessed Dec. 20, 2002.
GIBSON et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997, 13 pages.
Gibson et al., "NASD Scalable Storage Systems," Jun. 1999, 6 pages, USENIX99, Extreme Linux Workshop, Monterey, California.
Gupta et al., "Algorithms for Packet Classification," Dept, of Comput. Sci., Stanford Univ., CA 15(2):24-32 (Mar./Apr. 2001) (Abstract only).
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "The Tiger Shark File System," 1998, in proceedings of IEEE, Spring COMPCON, Santa Clara, CA, www.research.IBM.com, last accessed on Dec. 30, 2002.
Heinz, "Priorities in Stream Transmission Control Protocol (SCTP) Multistreaming," Thesis submitted to the Faculty of the University of Delaware (Spring 2003).
Hwang et al., "Designing SSI Clusters with Hierarchical Checkpointing and Single 1/0 Space," IEEE Concurrency, Jan.-Mar. 1999, pp. 60-69.
Ilvesmaki et al., "On the Capabilities of Application Level Traffic Measurements to Differentiate and Classify Internet Traffic," Presented in SPIE's International Symposium ITCom, Denver Colorado USA (Aug. 19-21, 2001).
International Search Report for International Patent Application No. PCT/US2008/083117 (dated Jun. 23, 2009).
International Search Report for International Patent Application No. PCT/US2008/060449 (dated Apr. 9, 2008).
International Search Report for International Patent Application No. PCT/US2008/064677 (dated Sep. 6, 2009).
International Search Report for International Patent Application No. PCT/US02/00720, dated Mar. 19, 2003.
International Search Report for International Patent Application No. PCT/US2012/038228 (dated Oct. 19, 2012).
International Search Report from International Application No. PCT/US03/41202, dated Sep. 15, 2005.
Internet Protocol, "Darpa Internet program Protocol Specification," (RFC:791) at http://www.ietf.org/rfc/rfc791.txt, by Information Sciences Institute University of Southern California, Marina del Rey, CA, for Defense Advanced Research Project Agency Information Processing Techniques Office, Arlington, VA, pp. 1-49 (Sep. 1981).
Karamanolis, C. et al., "An Architecture for Scalable and Manageable File Services," HPL-2001-173, Jul. 26, 2001. pp.1-14.
Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.
Kawamoto, D., "Amazon files for Web services patent", CNET News.com, Jul. 28, 2005, pp. 1-2, (http://news.com).
Kimball, C.E. et al., "Automated Client-Side Integration of Distributed Application Servers," 13Th LISA Conf., 1999, pp. 275-282 of the Proceedings.
Klayman, J., response filed by Japanese associate to office action dated Jan. 22, 2007 in corresponding Japanese patent application No. 2002-556371.
Klayman, J., Nov. 13, 2008 e-mail to Japanese associate including instructions for response to office action dated May 26, 2008 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Kohl et al., "The Kerberos Network Authentication Service (V5)," RFC 1510, Sep. 1993, 105 pages, http://www.ietf.org/rfc/rfc1510.txt?number=1510.
Korkuzas, V., Communication pursuant to Article 96(2) EPC dated Sep. 11, 2007 in corresponding European patent application No. 02718824.2-2201, 3 pages.
LaMonica M., "Infravio spiffs up Web services registry idea", CNET News.com, May 11, 2004, pp. 1-2, (http://www.news.com).
Lelil, S., "Storage Technology News: AutoVirt adds tool to help data migration projects," Feb. 25, 2011, last accessed Mar. 17, 2011, 3 pages, <http://searchstorage.techtarget.com/news/article/0,289142,sid5_gci1527986,00.html>.
Long et al., "Swift/RAID: A distributed RAID System", Computing Systems, Summer 1994, 20 pages, vol. 7.
Mac Vittie, L., "Message-Based Load Balancing: Using F5 solutions to address the challenges of scaling Diameter, RADIUS, and message-oriented protocols", F5 Technical Brief, Jan. 2010, pp. 1-9, F5 Networks Inc., Seattle, Washington.
Modiano, "Scheduling Algorithms for Message Transmission Over a Satellitebroadcast System," MILCOM 97 Proceedings Lincoln Lab., MIT, Lexington, MA 2(2):628-34 (Nov. 2-5, 1997) (Abstract only).
Nichols, et al., "Definition of the Differentiated Services Field (DS Field) in the IPv4 and IPv6 Headers," (RFC:2474) at http://www.ieft.org/rfc/tfc2474.txt, pp. 1-19 (Dec. 1998).
Noghani et al., "A Novel Approach to Reduce Latency on the Internet: 'Component-Based Download'," Proceedings of the Computing, Las Vegas, NV, Jun. 2000, pp. 1-6 on the Internet: Inti Conf. on Internet.
Norton et al., "CIFS Protocol Version CIFS-Spec 0.9," 2001, 125 pages, Storage Networking Industry Association (SNIA), www.snia.org, last accessed on Mar. 26, 2001.
Novotny et al., "An Online Credential Repository for the Grid: MyProxy," 2001, pp. 1-8.
Ott et al., "A Mechanism for TCP-Friendly Transport-level Protocol Coordination," Proceedings of the General Track of the Annual Conference on USENIX Annual Technical Conference (Jun. 2002).
Padmanabhan, "Using Predictive Prefething to Improve World Wide Web Latency," '96, SIGCOM, all pp. (1-15).
Pashalidis et al., "A Taxonomy of Single Sign-On Systems," 2003, pp. 1-16, Royal Holloway, University of London, Egham Surray, TW20, 0EX, United Kingdom.
Pashalidis et al., "Impostor: A Single Sign-On System for Use from Untrusted Devices," Global Telecommunications Conference, 2004,

(56) References Cited

OTHER PUBLICATIONS

GLOBECOM '04, IEEE, Issue Date: Nov. 29,-Dec. 3, 2004, 5 pages, Royal Holloway, University of London.
Patterson et al., "A case for redundant arrays of inexpensive disks (RAID)", Chicago, Illinois, Jun. 1-3, 1998, pp. 109-116, in Proceedings of ACM SIGMOD conference on the Management of Data, Association for Computing Machinery, Inc.
Pearson, P. K., "Fast Hashing of Variable-Length Text Strings," Comm. of the ACM, Jun. 1990, pp. 677-680, vol. 33, No. 6.
Peterson, M., "Introducing Storage Area Networks," Feb. 1998, 6 pages, InfoStor, www.infostor.com. last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org/publications/library/proceedings/als2000/full_papers/preslan/presl, last accessed on Dec. 20, 2002.
Raghavan B., et al., "Cloud Control with Distributed Rate Limiting", SIGCOMM'07, Aug. 27-31, 2007, pp. 1-11, Department of Computer Science and Engineering, University of California, San Diego, CA.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, U.S., Mar. 26, 2000 (Mar. 26, 2000), pp. 864-873, XP010376176 ISBN: 0-7803-5880-5 p. 867, col. 2, last paragraph -p. 868, col. 1, paragraph 1.
Rosen, et al., "MPLS Label Stack Encoding," (RFC: 3032) at http://www.iett.org/rfc/rfc3032.txt, pp. 1-2 2 (Jan. 2001).
RSYNC, "Welcome to the RSYNC Web Pages," Retrieved from the Internet URL: http://samba.anu.edu.ut.rsync/. (Retrieved on Dec. 18, 2009), 5 pages.
Savage, et al., "Afraid—A Frequently Redundant Array of Independent Disks," Jan. 22-26, 1996, pp. 1-13, USENIX Technical Conference, San Diego, California.
Schilit B., "Bootstrapping Location-Enhanced Web Services", University of Washington, Dec. 4, 2003, (http://www.cs.washington.edu/news/colloq.info.html).
Seeley R., "Can Infravio technology revive UDDI?", ADTmag.comAccessed Sep. 30, 2004, (http://www.adtmag.com).
Shohoud, Y., "Building XML Web Services with VB .NET and VB 6", Addison Wesley, Sep. 17, 2002, pp. 1-14.
Sleeper B., "The Evolution of UDDI", UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Snoeren A., et al., "Managing Cloud Resources:Distributed Rate Limited", Building and Programming the Cloud Workshop, Jan. 13, 2010, pp. 1-10, UCSDCSE Computer Science and Engineering.
Soltis et al., "The Design and Performance of a Shared Disk File System for IRIX," Mar. 23-26, 1998, pp. 1-17, SixthNASA Goddard Space Flight Center Conference on Mass Storage and Technologies in cooperation with the Fifteenth IEEE Symposium on Mass Storage Systems, University of Minnesota.
Soltis et al., "The Global File System," Sep. 17-19, 1996, 24 pages, in Proceedings of the Fifth NASA Goddard Space Flight Center Conference on Mass Storage Systems and Technologies, College Park, Maryland.
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-7, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Sorenson, K.M., "Installation and Administration: Kimberlite Cluster Version 1.1.0, Rev. Dec. 2000," 137 pages, Mission Critical Linux, http://oss.missioncriticallinux.com/kimberlite/kimberlite.pdf.
Stakutis, C., "Benefits of SAN-based file system shanng," Jul. 2000, pp. 1-4, InfoStor, www.infostor.com, last accessed on Dec. 30, 2002, Penn Well Corporation.
Thekkath et al., "Frangipani: A Scalable Distributed File System," in Proceedings of the 16th ACM Symposium on Operating Systems Principles, Oct. 1997, pp. 1-14, Association for Computing Machinery, Inc.
Traffix Systems, "Diameter Routing Agent (DRA)", Accessed Apr. 8, 2013, pp. 2-5, (http://www traffixsystems comsolutionsdiameter-routing-agent-DRA).
Traffix Systems, "Product Brochure, Traffix Signaling Deliver Controller™ (SDC)", Mar. 2011, pp. 1-11, F5 Networks Inc.
Traffix Systems, "Signaling Deliver Controller™: Control Your 4G Network", Data Sheet, Mar. 2011, pp. 1-6, F5 Networks Inc.
Traffix Systems, "Signaling Delivery Controller (SDC)", Jul. 1, 2012, pp. 2-5, (http://www traffixsystems comsolutionsSDC).
Tulloch, Mitch, "Microsoft Encyclopedia of Security," 2003, pp. 218, 300-301, Microsoft Press, Redmond, Washington.
UDDI "UDDI Version 3.0.1", UDDI Spec Technical Committee Specification, Oct. 14, 2003, pp. 1-383, uddi.org, (http://www.uddi.org/).
UDDI, "UDDI Overview", Sep. 6, 2000, pp. 1-21, uddi.org, (http://www.uddi.org/).
UDDI, "UDDI Technical White Paper," Sep. 6, 2000, pp. 1-12, uddi-org, (http://www.uddi.org/).
Uesugi, H., Nov. 26, 2008 amendment filed by Japanese associate in response to office action dated May 26, 2008 in corresponding Japanese patent application No. 2002-556371, 5 pages.
Uesugi, H., English translation of office action dated May 26, 2008 in corresponding Japanese patent application No. 2002-556371, 2 pages.
Wang, "Priority and Realtime Data Transfer Over the Best-effort Internet," University of Massachusetts Amherst Dissertation (2005) (Abstract only).
Wikipedia, "Diameter (protocol)", pp. 1-11, last accessed Oct. 27, 2010, (http://en.wikipedia.org/wiki/Diameter_(protocol)).
Wilkes, J., et al., "The HP AutoRAID Hierarchical Storage System," Feb. 1996, 29 pages, vol. 14, No. 1, ACM Transactions on Computer Systems.
Woo, "A Modular Approach to Packet Classification: Algorithms and Results," Nineteenth Annual Conference of the IEEE Computer and Communications Societies 3(3)1213-22 (Mar. 26-30, 2000).
Zayas, E., "AFS-3 Programmer's Reference: Architectural Overview," Sep. 2, 1991, 37 pages, Version 1.0 (doc. number FS-00-D160) Transarc Corporation.

\* cited by examiner

METHODS FOR MULTIPATH TRANSMISSION CONTROL PROTOCOL (MPTCP) BASED SESSION MIGRATION AND DEVICES THEREOF

This application claims the benefit of U.S. Provisional Patent Application Ser. No. 62/613,765, filed Jan. 5, 2018, which is hereby incorporated by reference in its entirety.

BACKGROUND

A session between a client device and a server device of a network utilizes a request response pair. Typically, the client device accesses data at the server device during the session for a period of time.

However, if the session between the client device and the server device is prolonged, this results in an increased load on the server device which is not beneficial for overall network efficiency. Additionally, if during the session the client device moves away from a home location server device to a new location to access an away location server device, this presents a challenge in maintaining a continuous session without discontinuity.

To prevent discontinuity, a migration of sessions between client device and server device without introducing application faults is needed which requires a mechanism to transition transmission control protocol (TCP) connections which previously has not been effectively solved.

SUMMARY

A method for multipath transmission control protocol (MPTCP) based session migration, implemented by a network traffic management system comprising one or more network traffic management apparatuses, administrator devices, client devices, or server devices includes managing a client-server pair flow transactions between a client device and a primary computing device over a first multipath transmission control protocol (MPTCP) session established over a first connection. An indication to migrate a MPTCP session date data associated with the first MPTCP session from the primary computing device to a secondary computing device is received. The MPTCP session state data associated with the first MPTCP session is migrated to the secondary computing device. As identifier associated with the secondary computing device is advertised to the client device. An indication of a second MPTCP session being established between the client device and the secondary computing device is received from the secondary computing device. The first connection between the client device and the primary computing device is terminated.

A primary computing apparatus including memory including programmed instructions stored thereon and one or more processors configured to be capable of executing the stored programmed instructions to manage a client-server pair flow transactions between a client device and a primary computing device over a first multipath transmission control protocol (MPTCP) session established over a first connection. An indication to migrate a MPTCP session date data associated with the first MPTCP session from the primary computing device to a secondary computing device is received. The MPTCP session state data associated with the first MPTCP session is migrated to the secondary computing device. As identifier associated with the secondary computing device is advertised to the client device. An indication of a second MPTCP session being established between the client device and the secondary computing device is received from the secondary computing device. The first connection between the client device and the primary computing device is terminated.

A non-transitory computer readable medium having stored thereon instructions for including executable code that, when executed by one or more processors, causes the processors to manage a client-server pair flow transactions between a client device and a primary computing device over a first multipath transmission control protocol (MPTCP) session established over a first connection. An indication to migrate a MPTCP session date data associated with the first MPTCP session from the primary computing device to a secondary computing device is received. The MPTCP session state data associated with the first MPTCP session is migrated to the secondary computing device. As identifier associated with the secondary computing device is advertised to the client device. An indication of a second MPTCP session being established between the client device and the secondary computing device is received from the secondary computing device. The first connection between the client device and the primary computing device is terminated.

A network traffic management system includes a memory comprising programmed instructions stored thereon for one or more primary computing modules, secondary computing modules, client modules, or remote server modules and one or more processors configured to be capable of executing the stored programmed instructions to manage a client-server pair flow transactions between a client device and a primary computing device over a first multipath transmission control protocol (MPTCP) session established over a first connection. An indication to migrate a MPTCP session date data associated with the first MPTCP session from the primary computing device to a secondary computing device is received. The MPTCP session state data associated with the first MPTCP session is migrated to the secondary computing device. As identifier associated with the secondary computing device is advertised to the client device. An indication of a second MPTCP session being established between the client device and the secondary computing device is received from the secondary computing device. The first connection between the client device and the primary computing device is terminated.

This technology has a number of associated advantages including providing methods, non-transitory computer readable media, primary computing apparatuses, and network traffic management systems that provides an optimized process of transitioning a TCP connection from one device to another by using features of multipath transmission control protocol (MPTCP) to enable session migration. With MPTCP migration the sockets used in the transport layer are switched from the primary traffic management apparatus to the secondary traffic management apparatus. As these sockets are in the transport layer, the application layer of the devices is not disturbed and they continue processing and servicing the requested content between the client device and the one or more server devices without interruption. As a result the client device is not affected and keeps on receiving the requested data seamlessly without any discontinuity, this eliminates application faults.

DETAILED DESCRIPTION

Figure 1:
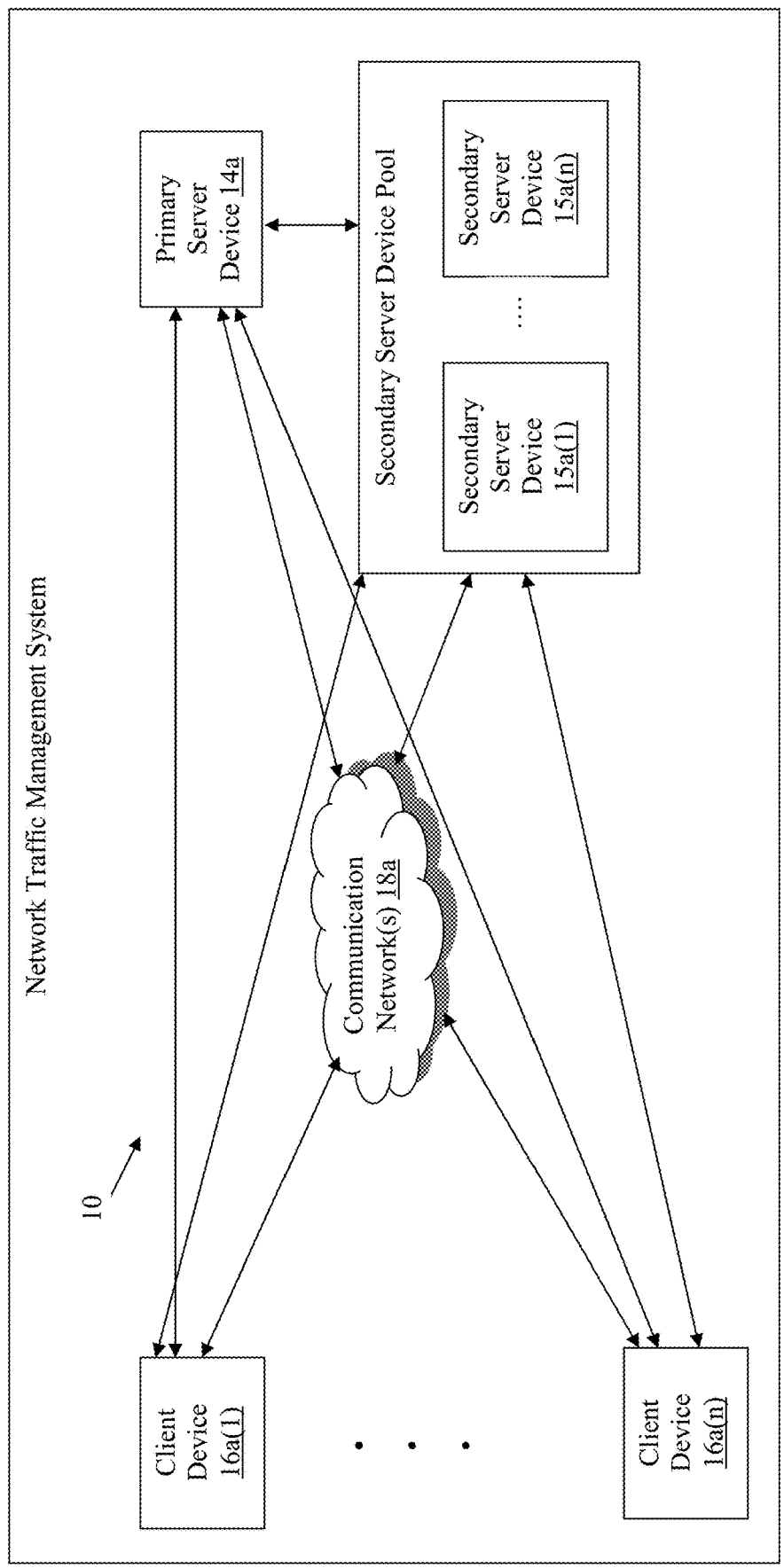
FIG. 1 is a block diagram of an exemplary network traffic management system with a primary server device and a secondary server device pool.

Referring to FIG. 1, an exemplary network environment which incorporates an exemplary network traffic management system 10 is illustrated. The network traffic management system 10 in this example includes a primary server device 14a and a secondary server device pool including plurality of secondary server devices 15a(1)-15a(n) and a plurality of client devices 16a(1)-16a(n) coupled via communication network(s) 18a, although the primary server device 14a and the plurality of secondary server devices 15a(1)-15a(n), and/or client devices 16a(1)-16a(n) may be coupled together via other topologies. Additionally, the network traffic management system 10 may include other network devices such as one or more routers and/or switches, for example, which are well known in the art and thus will not be described herein. This technology provides a number of advantages including methods, non-transitory computer readable media, network traffic management systems, and the server devices that provide an optimized process of transitioning a TCP connection from a primary server device to a secondary server device by using features provided by multipath transmission control protocol (MPTCP) to enable an improved session migration. Further, the session migration is performed without involving the application layer involved in the request response pair which results in evading any discontinuity in communication of data to the client devices 16a(1)-16a(n) and further enables TCP session migration during device maintenance.

In this particular example, the primary server device 14a, the secondary server devices 15a(1)-15a(n) and the plurality of client devices 16a(1)-16a(n) are disclosed in FIG. 1 as dedicated hardware devices. However, one or more of the primary server device 14a and the secondary server devices 15a(1)-15a(n), or client devices 16a(1)-16a(n) can also be implemented in software within one or more other devices in the network traffic management system 10. As used herein, the term "module" refers to either an implementation as a dedicated hardware device or apparatus, or an implementation in software hosted by another hardware device or apparatus that may be hosting one or more other software components or implementations.

As one example, the primary server device 14a, as well as any of its components, models, or applications, can be a module implemented as software executing on one of the secondary server devices 15a(1)-15a(n), and many other permutations and types of implementations can also be used in other examples. Moreover, any or all of the primary server device 14a, secondary server devices 15a(1)-15a(n), and client devices 16(1)-16(n), can be implemented, and may be referred to herein, as a module.

Figure 2:
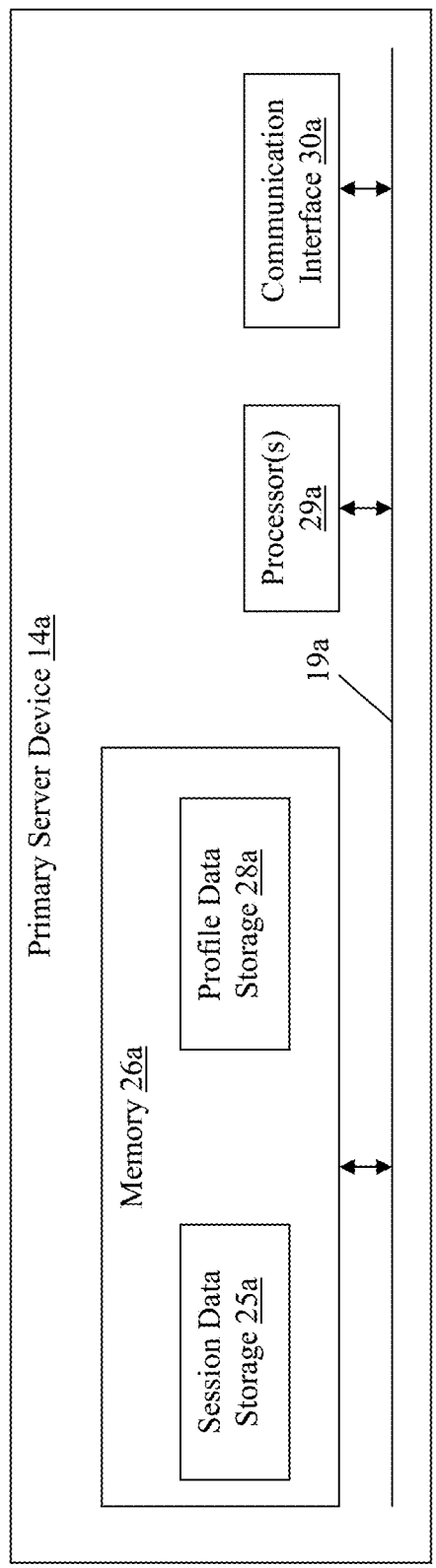
FIG. 2 is a block diagram of an exemplary primary server device of FIG. 1.

Referring to FIGS. 1-2, the primary server device 14a of the network traffic management system 10 may perform any number of functions including migrating sessions between devices, managing network traffic, load balancing network traffic across the server devices, global load balancing network traffic, identifying potential security threats to the network traffic, accelerating network traffic associated with web applications or accelerating network traffic associated with an application hosted by one or more of the secondary server devices 15a(1)-15a(n), for example. The primary server device 14a in this example includes one or more processor(s) 29a, a memory 26a, and a communication interface 30a, which are coupled together by a bus 19a, although the primary server device 14a can include other types or numbers of elements in other configurations.

The processor(s) 29a of the primary server device 14a may execute programmed instructions stored in the memory 26a of the primary server device 14a for any number of the functions identified above. The processor(s) 29a of the primary server device 14a may include one or more central processing units (CPUs) or general purpose processors with one or more processing cores, for example, although other types of processor(s) can also be used.

The memory 26a of the primary server device 14a stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 29a, can be used for the memory 26a.

Figure 5:
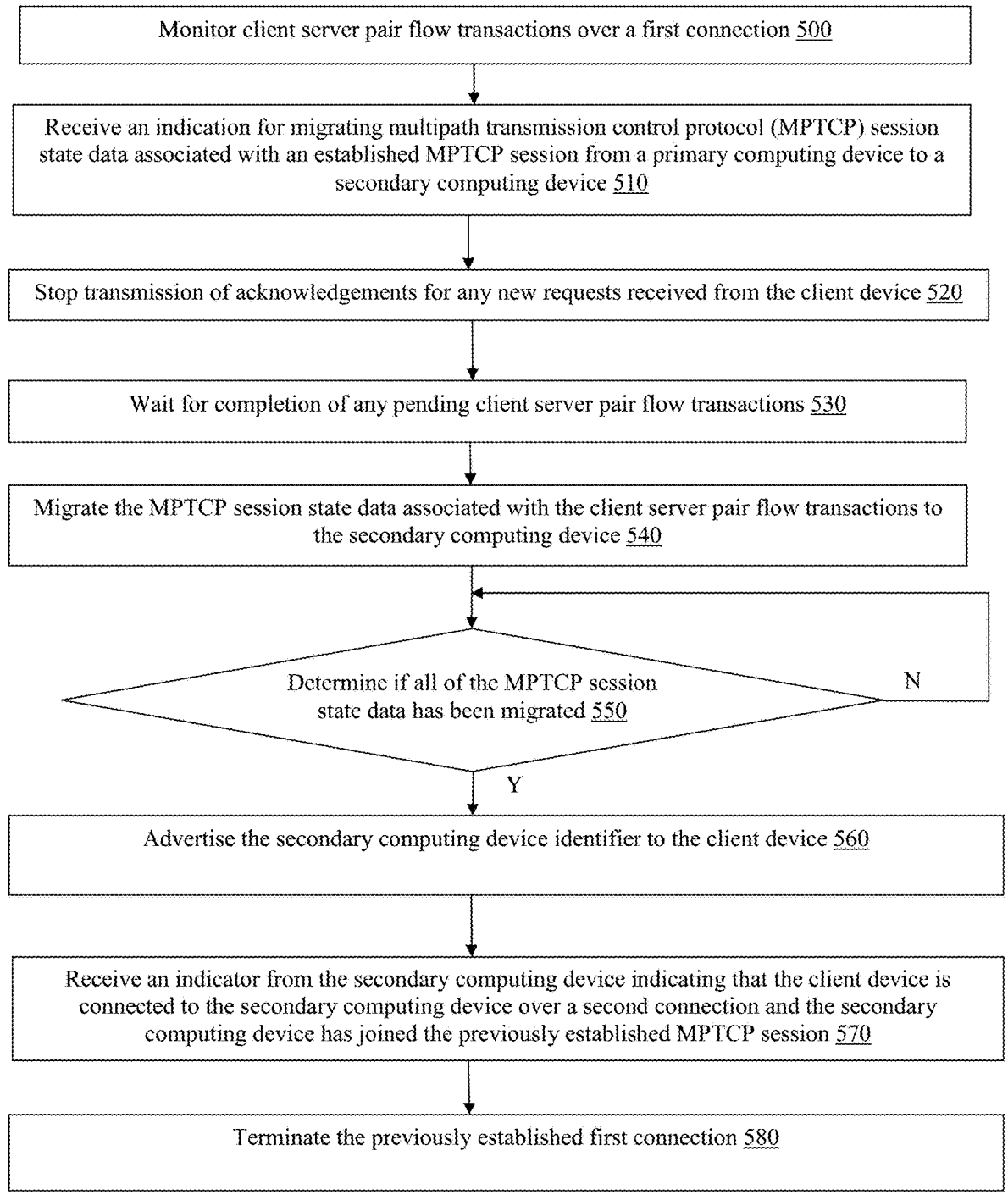
FIG. 5 is a flowchart of an exemplary method for exemplary network traffic management system with a primary server device and secondary server device pool of FIG. 1.

Accordingly, the memory 26a of the primary server device 14a can store one or more applications that can include computer executable instructions that, when executed by the primary server device 14a, cause the primary server device 14a to perform actions, such as to transmit, receive, or otherwise process messages, for example, and to perform other actions described and illustrated below with reference to FIGS. 5-6. The application(s) can be implemented as modules or components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the primary server device 14a, may be located in virtual server(s) running in a cloud-based computing environment rather than being tied to one or more specific physical network computing devices. Also, the application(s) may be running in one or more virtual machines (VMs) executing on the server device. Additionally, in one or more embodiments of this technology, virtual machine(s) running on the server device may be managed or supervised by a hypervisor.

In this particular example, the memory 26a of the primary server device 14a includes session data storage 25a and profile data storage 28a, although the memory can include other types and/or numbers of policies, modules, databases, applications, and/or other data for example.

The session data storage 25a may store information associated with tracking a request response pair session associated between the client devices 16a(1)-16a(n) and the primary server device 14a. The request response pair session may correspond to communications performed between the client devices 16a(1)-16a(n) and the primary server device 14a forming a client-server pair flow transactions referred to as flow transactions. The flow transactions may include information about accessing by the client devices 16a(1)-16a(n) content at the primary server device 14a to form a session. The session data storage 25a information may also be used to determine when a session is completely migrated to an another device. By way of example, the another device may include the secondary server devices 15a(1)-15a(n).

The profile data storage 28a may store information associated with server load, server location, and/or monitoring user traffic data, although other types of data may be stored. The server load may include, for example, information associated with load capacity of the server and/or the peak load capacity of the server. The stored information may include other information, for example information on which of the client device 16a(1)-16a(n) accesses which of the server devices 15a(1)-15a(n) at which location over a period of time. The stored information may also identify the primary server device 14a as a home server device for one of the client devices 16a(1)-16a(n), based on a determination that the one of the client devices 16a(1)-16a(n) accesses that the primary server device 14a regularly. Further, the stored information may also identify the primary server device 14a as an away server device for one of the client devices 16a(1)-16a(n), based on determining that the one of the client devices 16a(1)-16a(n) does not access the primary server device 14a regularly, although other manners for determining home and/or away server devices for one or more client devices 16a(1)-16a(n) may be used. The stored information may also include user traffic data associated with the client device such as, tracked historical session information associated with the client devices 16a(1)-16a(n) over a period of time, although other type of information may be stored. The tracked historical information may include tracked information on various user activity, such as frequency of accessing websites by the client devices 16a(1)-16a(n), types of activity associated with the websites, historical shopping activity, and/or network activity any other activities in association with websites by way of example. The stored information may or may not identify one of the client devices 16a(1)-16a(n) as a known client device and/or may or may not store a classification of the one of the client devices 16a(1)-16a(n) as a safe device based on any identified security threat associated with that one of the client devices 16a(1)-16a(n). Further the stored information may identify the primary server device 14a that will best service a request based on the location and historical information associated with the client devices 16a(1)-16a(n) as explained below.

Referring back to FIGS. 1-2, the communication interface 30a of the primary server device 14a operatively couples and communicates between the secondary server devices 15a(1)-15a(n) server devices, and/or the client devices 161(1)-16a(n), which are all coupled together by the communication network(s) 18a, although other types and/or numbers of communication networks or systems with other types and/or numbers of connections and/or configurations to other devices and/or elements can also be used.

By way of example only, the communication network(s) 18(a) can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18(a) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The primary server device 14a is illustrated in this example as a including a single device, the primary server device 14a in other examples can include one or more of the secondary server devices 15a(1)-15a(n). While each of the primary server device 14a and the secondary server devices 15a(1)-15a(n) is illustrated in this example as including a single device, the primary server device 14a and the secondary server devices 15a(1)-15a(n) in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the primary server device 14a. Although the primary server device 14a is illustrated as single device, there may be one or more primary server device 14a connected to one or more secondary server devices 15a(1)-15a(n).

Additionally, one or more of the devices that together comprise the primary server device 14a in other examples can be standalone devices or integrated with one or more other devices or apparatuses, such as one of the secondary server devices 15a(1)-15a(n), for example. Moreover, one or more of the devices of the primary server device 14a in these examples can be in a same or a different communication network including one or more public, private, or cloud networks, for example.

Each of the secondary server devices 15a(1)-15a(n) of the network traffic management system 10 in this example includes processor(s), a memory, and a communication interface, which are coupled together by a bus or other communication link, although other numbers or types of components could be used. The secondary server devices 15a(1)-15a(n) in this example can include application servers, database servers, access control servers, or encryption servers, for example, that exchange communications along communication paths expected based on application logic in order to facilitate interactions with an application by users of the client devices 16a(1)-16a(n).

Although the secondary server devices 15a(1)-15a(n) are illustrated as single devices, one or more actions of each of the secondary server devices 15a(1)-15a(n) may be distributed across one or more distinct network computing devices that together comprise one or more of the secondary server devices 15a(1)-15a(n). Moreover, the secondary server devices 15a(1)-15a(n) are not limited to a particular configuration. Thus, the secondary server devices 15a(1)-15a(n) may contain a plurality of network computing devices that operate using a master/slave approach, whereby one of the network computing devices of the server devices operate to manage and/or otherwise coordinate operations of the other network computing devices. The secondary server devices 15a(1)-15a(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the secondary server devices 15a(1)-15a(n) can operate within the primary server device 14a itself rather than as a stand-alone server device communicating with the primary server device 14a via communication network(s) 18a. In this example, the one or more of the secondary server devices 15a(1)-15a(n) operate within the memory 26a of the primary server device 14a.

The client devices 16a(1)-16a(n) of the network traffic management system 10 in this example include any type of computing device that can exchange network data, such as mobile, desktop, laptop, or tablet computing devices, virtual machines (including cloud-based computers), or the like. Each of the client devices 16a(1)-16a(n) in this example includes a processor, a memory, and a communication interface, which are coupled together by a bus or other communication link, although other numbers and/or types of network devices could be used.

The client devices 16a(1)-16a(n) may run interface applications, such as standard web browsers or standalone client applications, which may provide an interface to make requests for, and receive content stored on, one or more of the primary server device 14a, the secondary server devices 15a(1)-15a(n) via the communication network(s) 18a. The client devices 16a(1)-16a(n) may further include a display device, such as a display screen or touchscreen, and/or an input device, such as a keyboard for example. Additionally, one or more of the client devices 16a(1)-16a(n) can be configured to execute software code (e.g., JavaScript code within a web browser) in order to log client-side data and provide the logged data to the primary server device 14a', as described and illustrated in more detail later.

Although the exemplary network traffic management system 10 with the primary server device 14a, the secondary server devices 15a(1)-15a(n), client devices 16a(1)-16a(n), and communication network(s) 18a are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the primary server device 14a, the secondary server devices 15a(1)-15a(n) and the client devices 16a(1)-16a(n), for example, may be configured to operate as virtual instances on the same physical machine. In other words, one or more of the client devices 16a(1)-16a(n), the primary server device 14a, or the secondary server devices 15a(1)-15a(n) may operate on the same physical device rather than as separate devices communicating through communication network(s). Additionally, there may be more or fewer the primary server device 14a, the secondary server devices 15a(1)-15a(n) and the client devices 16a(1)-16a(n) than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having instructions stored thereon, such as in the memory 26a, for one or more aspects of the present technology, as described and illustrated by way of the examples herein. The instructions in some examples include executable code that, when executed by one or more processors, such as the processor(s) 29a, cause the processors to carry out steps necessary to implement the methods of the examples of this technology that are described and illustrated herein.

An exemplary method of multipath transmission control protocol (MPTCP) based session migration and devices will now be described with reference to FIGS. 1-2, 5-6. Referring more specifically to FIG. 5, in a first step 500 the primary computing device monitors client server pair flow transactions between at least one of the client devices 16a(1)-16a(n) and itself over an established first connection. By way of example, the primary computing device in this example is the primary server device 14a of FIG. 1, although the primary computing device could be any other device and the one of the client device is the client device 16a(1). The primary server device 14a of the network traffic management system monitors client-server pair flow transactions between the client device 16a(1) and the primary server device 14a over an established first connection. In another example, the primary server device 14a of the network traffic management system 10 monitors client-server pair flow transactions between the client device 16a(1), the primary server device 14a and other secondary server devices 15a(1)-15a(n). The client device 16a(1) sends a SYN request including a MPTCP connection request to the primary server device 14a. In response to the SYN request the primary server device 14a sends a transmit SYN acknowledgement message to acknowledge receiving the SYN request to the client device 16a(1). Upon receiving the SYN acknowledgment the primary server device 14a and the client device 16a(1) establishes a first MPTCP session and exchanges MPTCP session data between them. Further, the primary server device 14a receives from a client device 16a(1) a client access request to access applications at the primary server device 14a and the secondary server devices 15a(1)-15a(n). Upon receiving the client access request the primary server device 14a transmits to the client device 16a(1) an acknowledgment for the client access request, to acknowledge receiving of the client access request. The primary network server device 14a then forwards a server response from the primary server device 14a to the client device 16a(1). The server response grants access to the application content requested by the client device 16a(1). The client device 16a(1) then accesses the primary server device 14a and thus establishing a first connection to transmit and receive content. The primary server device 14a manages the first connection by monitoring and storing session information associated with tracking a request response pair session associated between a client device 16a(1) and itself in the session data storage. This session information may include MPTCP session data exchanged between the client device 16*a*(1) and the primary server device 14*a*. The request response pair session corresponds to flow transactions performed between a client device 16*a*(1) and the primary server device 14*a* forming a client-server pair flow transactions. Further, the flow transactions may include accessing by the client device 16*a*(1) content at the primary server device 14*a* to form a session.

In another example, the primary server device 14*a* is a primary network traffic management apparatus 14*b* and the secondary server devices 15*a*(1)-15*a*(*n*) are secondary network traffic management apparatus 15*b*(1)-15*b*(*n*) of FIG. 3 explained in detail later below.

In step 510, the primary network traffic management apparatus 14*a* of the network traffic management system 10 receives an indication for migrating multipath transmission control protocol (MPTCP) session state data associated with the client-server pair flow transactions between the client device 16*a*(1) and the primary server device 14*a* to one or more of the secondary computing devices. By way of example, the one or more secondary computing devices in this example are the one or more secondary server devices 15*a*(1)-15*a*(*n*) in the secondary server device pool of FIG. 1, although the secondary computing device could be any other device. In this example, the primary computing device is the primary server device 14*a* and the one or more secondary computing devices are the one or more secondary server devices 15*a*(1)-15*a*(*n*).

Receiving the indication may include, for example, receiving the indication automatically based on predefined policies. The predefined polices associated with automatically receiving an indication for migrating the MPTCP sessions may include migration policies stored in the profile data storage 28*a*. The primary server device 14*a* analyzes the migration policies to determine corresponding actions associated with those migration policies.

The migration policies include analyzing the client-server pair flow transactions between the client device 16*a*(1) and the primary server device 14*a* to determine the type of content within the client-server pair flow transactions. When the type of content is determined to be a potential malicious content or a potential security threat, then the migration policy would migrate the client-server pair flow transactions between the client device 16*a*(1) and the primary server device 14*a* to the secondary server device 15*a*(1) acting as an authentication entity and dedicated to handle that type of content. In this example, the secondary server device 15*a*(1) is dedicated to handle these threats which may include, for example, a DOS attack, viruses or any malicious content. In another example, the client-server pair flow transactions between the client device 16*a*(1) and the primary server device 14*a* can be migrated to a plurality of secondary server devices 15*a*(1)-15*a*(*n*).

By way of example, there are various ways to receive an indication for migrating the MPTCP session state data, for example, based on a user selection at a user interface or automatically based predefined polices associated with the network traffic. The session state data may include, for example, requests, responses, session protocol information and any information in relation to the client-server pair transactions. Further receiving the indication may include, receiving an indication based on a user selection at a user interface, for example, from an administrator associated with managing the network traffic. When the administrator wants to offline the primary network traffic management apparatus 14*a* for maintenance purposes, the administrator may use a user interface to provide the indication. For example, when it is determined by the primary network traffic management apparatus 14*a* that primary network traffic management apparatus 14*a* accessed by the client device 16*a*(1) is an away service device and then the action associated with a migration policy is that, this session is to be transmitted and handled by one or more of the secondary network traffic management apparatus 15*a*(1)-15*a*(*n*) that is a home service device. The home service device is a device accessed by the client device 16*a*(1) on a frequent basis over a period of time and an away server device is a device accessed by the client device 16*a*(1) for the first time or less frequently. Further, in another example, when it is determined that the primary network traffic management apparatus 14*a* servicing a request for the client device 16*a*(1) has a long lived session, and has reached its maximum peak load capacity or based on a predetermined load capacity limit then the action with another migration policy is that the session is to be handled by one or more of the secondary network traffic management apparatus 15*a*(1)-15*a*(*n*) that is capable to service the request. Further based on determining that the client device 16*a*(1) requesting the content is a potential security threat based on monitoring historical information associated with the client device 16*a*(1), or the client device 16*a*(1) is accessing the primary server device 14*a* for the first time or any unusual activity associated with the client device 16*a*(1), then the action associated with the migration policy determines that the client device 16*a*(1) to be transferred to be handled by a secondary network traffic management apparatus 15*a*(1)-15*a*(*n*) acting as an authentication server. Although other types of policies and ways may be implemented for receiving the indication for migrating a MPTCP session data.

In another example, the one or more secondary server devices 15*a*(1)-15*a*(*n*) could be the one or more secondary network traffic management apparatus 15*b*(1)-15*b*(*n*) of FIG. 3 explained in detail later below.

In step 520, the primary server device 14*a* of the network traffic management system 10 stops transmission of acknowledgments for any new request received from the client device 16*a*(1) upon receiving an indication to migrate the MPTCP session state data. The primary server device 14*a* may keep on receiving new client requests from the client device 16*a*(1) to access it. However, the primary server device 16*a*(1) stops sending acknowledgments for the new client requests received upon receiving an indication to migrate the MPTCP session state data.

In step 530, the primary server device 14*a* of the network traffic management system 10 waits for completion of any pending client-server pair flow transactions. The primary server device 14*a* determines for the first connection established between the client device 16*a*(1) and itself as having transactions that are in progress and are pending. In this example the primary server device 14*a* waits for all the pending transactions to be processed. Proceeding with migrating the session state data without processing the pending transactions would be problematic because the pending transactions would be left stuck in the first connection and could not be migrated. Accordingly, if there were pending transactions during migration, the migrated data would be incomplete with missing information, for example, missing response/request, only including a beginning of a response/request, only including a middle of the response/request or only including an ending of a response/request. As a result to avoid these issues the primary server device 14*a* waits before initiating any migration of the session until all of the pending transactions have been completed between the client device 16*a*(1) and itself.

In step 540, the primary server device 14*a* of the network traffic management system 10 migrates the MPTCP session state data associated with the client-server pair flow transactions to one of the secondary server devices 15*a*(1)-15*a*(*n*). By way of example, the secondary server device 15*a*(1) is the one of the secondary server devices 15*a*(1)-15*a*(*n*) that the MPTCP session state data is migrated to, by the primary server device 14*a* although the MPTCP session state data may be migrated any of the secondary server devices 15*a*(1)-15*a*(*n*).

The migration of the MPTCP session state data associated with the client-server pair flow transactions to the secondary server device 15*a*(1) is initiated upon determining that all of the pending client server pair flow transactions have been completed. The migration of the MPTCP session date to one or more secondary server devices 15*a*(1)-15*a*(*n*) is based on the indication received in step 510. When the indication received in step 510 is based on a determination that the session of the primary server device 14*a* accessed by the client device 16*a*(1) is a long lived session and that has reached its maximum peak load capacity or has reached a predetermined load capacity limit, then a determination is made that the session is to be handled by the secondary server device 15*a*(1) that is capable of handling the traffic load, then the session is migrated to the secondary server device 15*a*(1) that is capable of handling the traffic load. When the indication received in step 510 is based on a determination that the type of content of the session handled by the primary server device 14*a* is to be handled by the secondary server device 15*a*(1) that is dedicated to handle that type of content, then the session is migrated to the secondary server device 15*a*(1) associated with the dedicated to handle that type of content. When the indication received in step 510 is based on determination that the client device 16*a*(1) could be potentially a malicious user or a potential security threat and that the session is to be handled by a secondary server device 15*a*(1) dedicated to handle threats, such as a DOS attack, viruses, or any malicious content by way of example, then the session is migrated to a secondary server device 15*a*(1) dedicated to handle threats such as a DOS attack, viruses or any malicious content, although other types of policies and ways may be implemented for migrating the MPTCP session data. With MPTCP migration the sockets used in the transport layer are switched from the primary server device 14*a* to the secondary server device 15*a*(1). As these sockets are in the transport layer, the application layer of the devices is not disturbed and they continue processing and servicing the requested content between the client device 16*a* and the secondary server device 15*a*(1). As a result the client device 16*a*(1) is not affected and keeps on receiving the requested data seamlessly without any discontinuity. In another example, the primary server device 14*a* of the network traffic management system 10 migrates the MPTCP session state data associated with the client-server pair flow transactions to a plurality of secondary server devices 15*a*(1)-15*a*(*n*).

In step 550, the primary server device 14*a* of the network traffic management system 10 determines when all of the MPTCP session state data has been migrated. Upon determining that all of the MPTCP session state data associated with the first connection between the client device 16*a*(1) and the primary server device 14*a* has been migrated to the one of the secondary server device 15*a*(1) then the primary server device 14*a* moves to step 560. If in step 550, the primary server device 14*a* of the network traffic management system determines all of the MPTCP session state data has not migrated, then the No branch is taken to continue the migration. If in step 550, the primary server device 14*a* of the network traffic management system 10 determines all of the MPTCP session state data has been migrated, then the Yes branch is taken to step 560.

In step 560, In step 560, the primary server device 14*a* of the network traffic management system 10 advertises the identifier of the secondary server device 15*a*(1) to which the MPTCP session state data has been migrated to in step 550. The secondary server device identifier includes an IP address associated with the secondary server device 15*a*(1) or any type of identifier associated. Further, the client device 16*a*(1) sends a MPTCP join request to the secondary server device 15*a*(1) to establish a connection with the secondary server device 15*a*(1). The MPTCP join request is to join the previously established MPTCP session between the primary server device 14*a* and with the client device 16*a*(1) requesting the content. Upon receiving the MPTCP join request, the secondary server device 15*a*(1) establishes a second connection with the client device 16*a*(1) by joining to the previously established MPTCP session.

In step 570, the primary server device 14*a* of the network traffic management system receives an indicator from the secondary server device 15*a*(1) indicating that the client device 16*a*(1) is connected to the secondary server device 15*a*(1) and the secondary server device 15*a*(1) has joined the previously established MPTCP session to establish a second connection. The received indicator indicating that the secondary server device 15*a*(1) utilizes the transmitted MPTCP session state data to connect with the client device 16*a*(1) and further to join the MPTCP session previously established between the primary server device 14*a* and the secondary server device 15*a*(1). The indicator further indicates that the client device 16*a*(1) is now connected to the secondary server device 15*a*(1) and transmitting data based on the previously established MPTCP session.

In step 580, the primary server device 14*a* of the network traffic management system 10 terminates the first connection between the client device 16*a*(1) and itself. Once the primary server device 14*a* of the network traffic management system 10 receives an indicator of step 580 from the secondary server device 15*a*(1), then the primary server device 14*a* terminates the first connection between the client device 16*a*(1) and itself.

Figure 6:
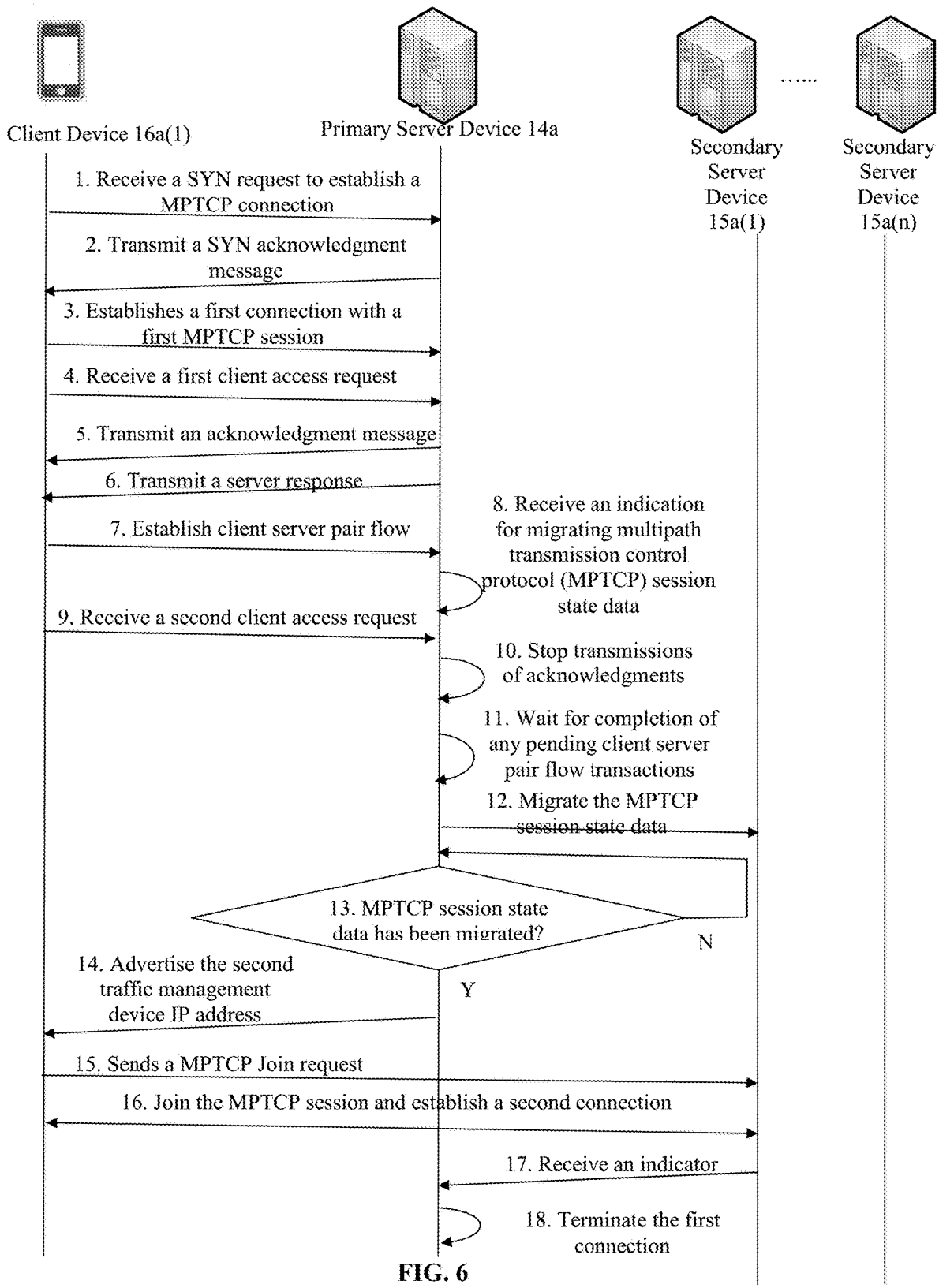
FIG. 6 is a timing diagram of an exemplary method for exemplary network traffic management system with a primary server device and secondary server device pool of FIG. 1.

Referring more specifically to FIG. 6, a timing diagram of an exemplary method of is illustrated. In a first step 1 in this example, the client device 16*a*(1) sends a SYN request including a MPTCP connection request to the primary server device 14*a* of the network traffic management system 10 to establish a connection. The primary server device 14*a* of the network traffic management system 10 receives the SYN request.

In step 2, the primary server device 14*a* of the network traffic management system in response to receiving the SYN request from the client device 16*a*(1) sends a transmit SYN acknowledgement message to acknowledge receiving the SYN request to the client device 16*a*(1).

In step 3, the primary server device 14*a* of the network traffic management system establishes a first MPTCP session. Upon receiving the SYN acknowledgment from the primary server device 14*a*, the primary server device 14*a* and the client device 16*a*(1) establishes a first MPTCP session and exchanges MPTCP session data between them.

In step 4, the primary server device 14*a* of the network traffic management system receives a first client access request to access applications at the primary server device 14*a*.

In step 5, the primary server device 14*a* of the network traffic management system transmits an acknowledgment message in response. Upon receiving the client access request the primary server device 14*a* transmits to the client device 16*a*(1) an acknowledgment for the client access request, to acknowledge receiving of the client access request.

In step 6, the primary server device 14*a* of the network traffic management system then sends a server response to the client device 16*a*(1). The server response grants access to the application content requested by the client device 16*a*(1).

In step 7, the primary server device 14*a* of the network traffic management system establishes a first connection with the client devices 16*a*(1) upon sending the server response to the client device 16*a*(1). This first connection is used to transmit and receive content and completes a client-server pair flow transaction to establish a MPTCP session. The primary server device 14*a* manages the first connection by monitoring and storing monitors and stores session information associated with tracking a request response pair session associated between a client device 16*a*(1) and itself in the session data storage. This session information may include MPTCP session data exchanged between the client device 16*a*(1) and itself. The request response pair session corresponds to flow transactions performed between a client device 16*a*(1) and the primary server device 14*a* forming a client-server pair flow transactions. Further, the flow transactions may include accessing by the client device 16*a*(1) content at the primary server device 14*a* to form a session.

In step 8, the primary network traffic management apparatus 14*a* of the network traffic management system 10 receives an indication for migrating multipath transmission control protocol (MPTCP) session state data associated with the client-server pair flow transactions between the client device 16*a*(1) and the primary server device 14*a* to one or more of the secondary computing devices. By way of example, the one or more secondary computing devices in this example are the one or more secondary server devices 15*a*(1)-15*a*(*n*) in the secondary server device pool of FIG. 1, although the secondary computing device could be any other device. In this example, the primary computing device is the primary server device 14*a* and the one or more secondary computing devices are the one or more secondary server devices 15*a*(1)-15*a*(*n*).

Receiving the indication may include, for example, receiving the indication automatically based on predefined policies. The predefined polices associated with automatically receiving an indication for migrating the MPTCP sessions may include migration policies stored in the profile data storage 28*a*. The primary server device 14*a* analyzes the migration policies to determine corresponding actions associated with those migration policies.

The migration policies include analyzing the client-server pair flow transactions between the client device 16*a*(1) and the primary server device 14*a* to determine the type of content within the client-server pair flow transactions. When the type of content is determined to be a potential malicious content or a potential security threat, then the migration policy would migrate the client-server pair flow transactions between the client device 16*a*(1) and the primary server device 14*a* to the secondary server device 15*a*(1) acting as an authentication entity and dedicated to handle that type of content. In this example, the secondary server device 15*a*(1) is dedicated to handle these threats which may include, for example, a DOS attack, viruses or any malicious content. In another example, the client-server pair flow transactions between the client device 16*a*(1) and the primary server device 14*a* can be migrated to a plurality of secondary server devices 15*a*(1)-15*a*(*n*).

By way of example, there are various ways to receive an indication for migrating the MPTCP session state data, for example, based on a user selection at a user interface or automatically based predefined polices associated with the network traffic. The session state data may include, for example, requests, responses, session protocol information and any information in relation to the client-server pair transactions. Further receiving the indication may include, receiving an indication based on a user selection at a user interface, for example, from an administrator associated with managing the network traffic. When the administrator wants to offline the primary network traffic management apparatus 14*a* for maintenance purposes, the administrator may use a user interface to provide the indication. For example, when it is determined by the primary network traffic management apparatus 14*a* that primary network traffic management apparatus 14*a* accessed by the client device 16*a*(1) is an away service device and then the action associated with a migration policy is that, this session is to be transmitted and handled by one or more of the secondary network traffic management apparatus 15*a*(1)-15*a*(*n*) that is a home service device. The home service device is a device accessed by the client device 16*a*(1) on a frequent basis over a period of time and an away server device is a device accessed by the client device 16*a*(1) for the first time or less frequently. Further, in another example, when it is determined that the primary network traffic management apparatus 14*a* servicing a request for the client device 16*a*(1) has a long lived session, and has reached its maximum peak load capacity or based on a pre determined load capacity limit then the action with another migration policy is that the session is to be handled by one or more of the secondary network traffic management apparatus 15*a*(1)-15*a*(*n*) that is capable to service the request. Further based on determining that the client device 16*a*(1) requesting the content is a potential security threat based on monitoring historical information associated with the client device 16*a*(1), or the client device 16*a*(1) is accessing the primary server device 14*a* for the first time or any unusual activity associated with the client device 16*a*(1), then the action associated with the migration policy determines that the client device 16*a*(1) to be transferred to be handled by a secondary network traffic management apparatus 15*a*(1)-15*a*(*n*) acting as an authentication server. Although other types of policies and ways may be implemented for receiving the indication for migrating a MPTCP session data.

In another example, the one or more secondary server devices 15*a*(1)-15*a*(*n*) could be the one or more secondary network traffic management apparatus 15*b*(1)-15*b*(*n*) of FIG. 3 explained in detail later below.

In step 9, the primary server device 14*a* of the network traffic management system receives a second client access request from the client device 16*a*(1).

In step 10, the primary server device 14*a* of the network traffic management system 10 stops transmission of acknowledgments for any new request received from the client device 16*a*(1) upon receiving an indication to migrate the MPTCP session state data. The primary server device 14*a* may keep on receiving new client requests from the client device 16*a*(1) to access it. However, the primary server device 16*a*(1) stops sending acknowledgments for the new client requests received upon receiving an indication to migrate the MPTCP session state data.

In step 11, the primary server device 14a of the network traffic management system 10 waits for completion of any pending client-server pair flow transactions. The primary server device 14a determines for the first connection established between the client device 16a(1) and itself as having transactions that are in progress and are pending. In this example the primary server device 14a waits for all the pending transactions to be processed. Proceeding with migrating the session state data without processing the pending transactions would be problematic because the pending transactions would be left stuck in the first connection and could not be migrated. Accordingly, if there were pending transactions during migration, the migrated data would be incomplete with missing information, for example, missing response/request, only including a beginning of a response/request, only including a middle of the response/request or only including an ending of a response/request. As a result to avoid these issues the primary server device 14a waits before initiating any migration of the session until all of the pending transactions have been completed between the client device 16a(1) and itself.

In step 12, the primary server device 14a of the network traffic management system 10 migrates the MPTCP session state data associated with the client-server pair flow transactions to one of the secondary server devices 15a(1)-15a(n). By way of example, the secondary server device 15a(1) is the one of the secondary server devices 15a(1)-15a(n) that the MPTCP session state data is migrated to by the primary server device 14a although the MPTCP session state data may be migrated any of the secondary server devices 15a(1)-15a(n).

The migration of the MPTCP session state data associated with the client-server pair flow transactions to the secondary server device 15a(1) upon determining that all of the pending client server pair flow transactions have been completed. The migration of the MPTCP session date to one or more secondary server devices 15a(1)-15a(n) is based on the indication received in step 510. When the indication received in step 510 is based on a determination that the session of the primary server device 14a accessed by the client device 16a(1) is a long lived session and that has reached its maximum peak load capacity or has reached a predetermined load capacity limit, then a determination is made that the session is to be handled by the secondary server device 15a(1) that is capable of handling the traffic load, then the session is migrated to the secondary server device 15a(1) that is capable of handling the traffic load. When the indication received in step 510 is based on a determination that the type of content of the session handled by the primary server device 14a is to be handled by the secondary server device 15a(1) that is dedicated to handle that type of content, then the session is migrated to the secondary server device 15a(1) associated with the dedicated to handle that type of content. When the indication received in step 510 is based on determination that the client device 16a(1) could be potentially a malicious user or a potential security threat and that the session is to be handled by a secondary server device 15a(1) dedicated to handle threats, such as a DOS attack, viruses, or any malicious content by way of example, then the session is migrated to a secondary server device 15a(1) dedicated to handle threats such as a DOS attack, viruses or any malicious content, although other types of policies and ways may be implemented for migrating the MPTCP session data. With MPTCP migration the sockets used in the transport layer are switched from the primary server device 14a to the secondary server device 15a(1). As these sockets are in the transport layer, the application layer of the devices is not disturbed and they continue processing and servicing the requested content between the client device 16a and the secondary server device 15a(1). As a result the client device 16a(1) is not affected and keeps on receiving the requested data seamlessly without any discontinuity. In another example, the primary server device 14a of the network traffic management system 10 migrates the MPTCP session state data associated with the client-server pair flow transactions to a plurality of secondary server devices 15a(1)-15a(n).

In step 13, the primary server device 14a of the network traffic management system 10 determines when all of the MPTCP session state data has been migrated. Upon determining that all of the MPTCP session state data associated with the first connection between the client device 16a(1) and the primary server device 14a has been migrated to the one of the secondary server device 15a(1) then the primary server device 14a moves to step 14.

Back in step 13, the primary server device 14a of the network traffic management system determines loops back to repeat the determination if all of the MPTCP session state data has been migrated when it determines that the all of the MPTCP session state data has not been migrated to the secondary server device 15a(1).

In step 14, the primary server device 14a of the network traffic management system 10 advertises the identifier of the secondary server device 15a(1) to which the MPTCP session state data has been migrated to in step 550. The secondary server device identifier includes an IP address associated with the secondary server device 15a(1) or any type of identifier associated.

In step 15, the client device 16a(1) sends a MPTCP join request to the secondary server device 15a(1) to establish a connection with the secondary server device 15a(1). The MPTCP join request is to join the previously established MPTCP session between the primary server device 14a and with the client device 16a(1) requesting the content.

In step 16, upon receiving the MPTCP join request, the secondary server device 15a(1) establishes a second connection with the client device 16a(1) by joining to the previously established MPTCP session.

In step 17, receive by the primary server device 14a of the network traffic management system an indicator from the secondary server device 15a(1) indicating that the client device 16a(1) is connected to the secondary server device 15a(1) and the secondary server device 15a(1) has joined the previously established MPTCP session. The received indicator indicating that the secondary server device utilizes the transmitted MPTCP session state data to connect and join the MPTCP session previously established between the primary server device and the client device. The indicator further indicates that the client device is now connected to the secondary server device and transmitting data based on the previously established MPTCP session.

In step 18, once primary server device 14a of the network traffic management system 10 terminates the first connection between the client device 16a(1) and itself. Once the primary server device 14a of the network traffic management system 10 receives an indicator of step 580 from the secondary server device 15a(1), then the primary server device 14a terminates the first connection between the client device 16a(1) and itself.

Figure 3:
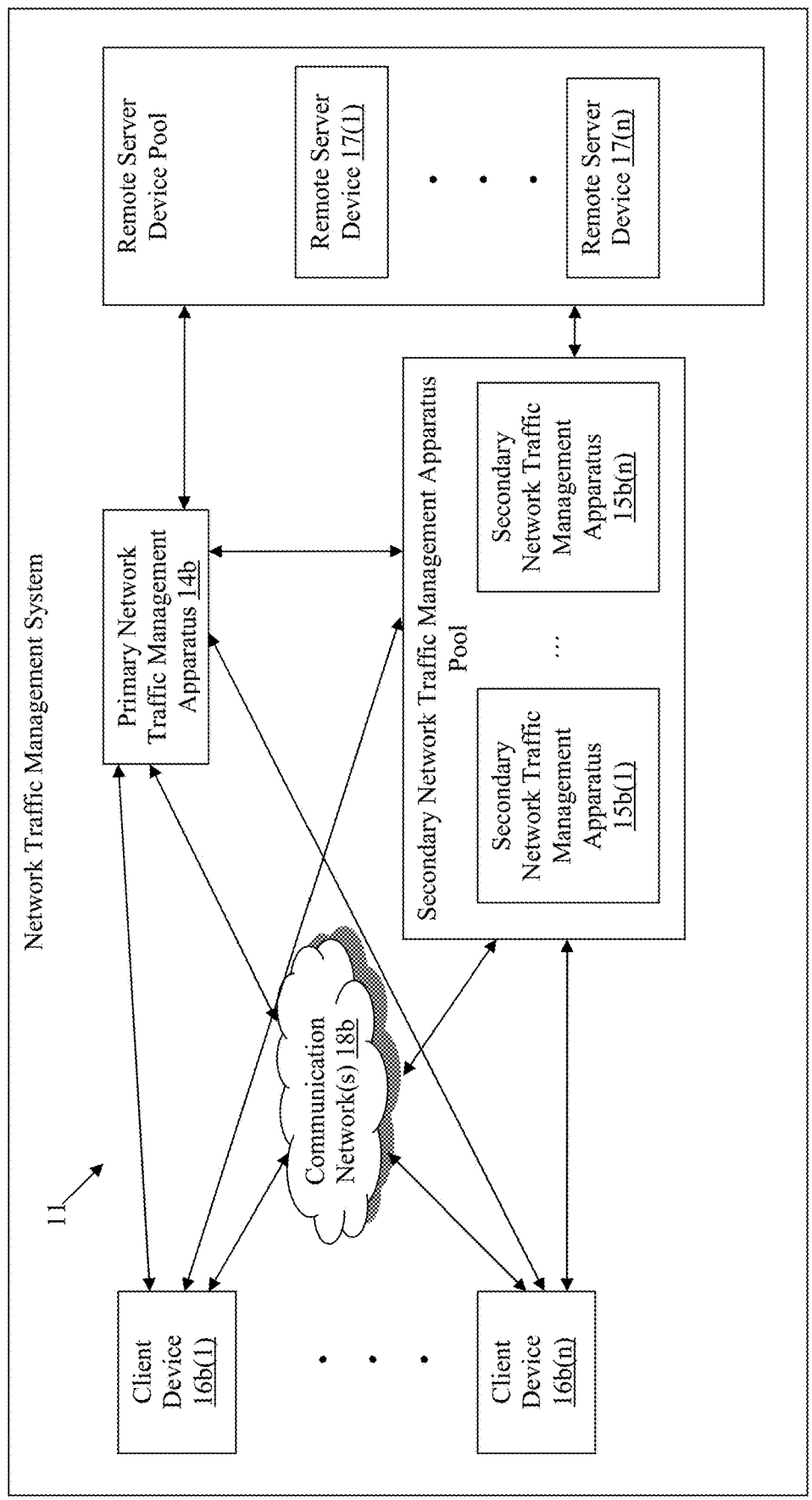
FIG. 3 is a block diagram of an exemplary network traffic management system with a primary network traffic management apparatus, a plurality of secondary network traffic management apparatus and remote server device pool.

Referring to FIG. 3, an exemplary network environment which incorporates an exemplary network traffic management system 11 is illustrated. The network traffic management system 11 in this example includes a primary network traffic management apparatus 14b that is coupled to a secondary network traffic management apparatus pool including a plurality of secondary network traffic management apparatus 15b(1)-15b(n), a remote server device pool including a plurality of remote server devices 17(1)-17(n) and a plurality of client devices 16b(1)-16b(n) via communication network(s) 18b, although the primary network traffic management apparatus 14b, the plurality of secondary network traffic management apparatus 15b(1)-15b(n), the remote server devices 17(1)-17(n), and/or client devices 16b(1)-16b(n) may be coupled together via other topologies. Additionally, the network traffic management system 11 may include other network devices such as one or more routers and/or switches, for example, which are well known in the art and thus will not be described herein. This technology provides a number of advantages including methods, non-transitory computer readable media, network traffic management systems, and network traffic management apparatuses that provides an optimized process of transitioning a TCP connection from one device to another device by using features provided by multipath transmission control protocol (MPTCP) to enable an improved session migration. Further, the session migration is performed without involving the application layer involved in the request response pair which results in evading any discontinuity in communication of data to the client device and further enables TCP session migration during device maintenance.

In this particular example, the primary network traffic management apparatus 14b, the secondary network traffic management apparatus 15b(1)-15b(n), the plurality of remote server devices 17(1)-17(n) and the plurality of client devices 16a(1)-16a(n) are disclosed in FIG. 1 as dedicated hardware devices. However, one or more of the primary network traffic management apparatus 14b and the secondary network traffic management apparatus 15b(1)-15b(n), the plurality of remote server devices 17(1)-17(n) or client devices 16a(1)-16a(n) can also be implemented in software within one or more other devices in the network traffic management system 10. As used herein, the term "module" refers to either an implementation as a dedicated hardware device or apparatus, or an implementation in software hosted by another hardware device or apparatus that may be hosting one or more other software components or implementations.

As one example, the primary network traffic management apparatus 14b, as well as any of its components, models, or applications, can be a module implemented as software executing on one of the secondary network traffic management apparatus 15b(1)-15b(n), and many other permutations and types of implementations can also be used in other examples. Moreover, any or all of the primary network traffic management apparatus 14b, secondary network traffic management apparatus 15b(1)-15b(n), remote server devices 17(1)-17(n) and client devices 16(1)-16(n), can be implemented, and may be referred to herein, as a module.

Figure 4A:
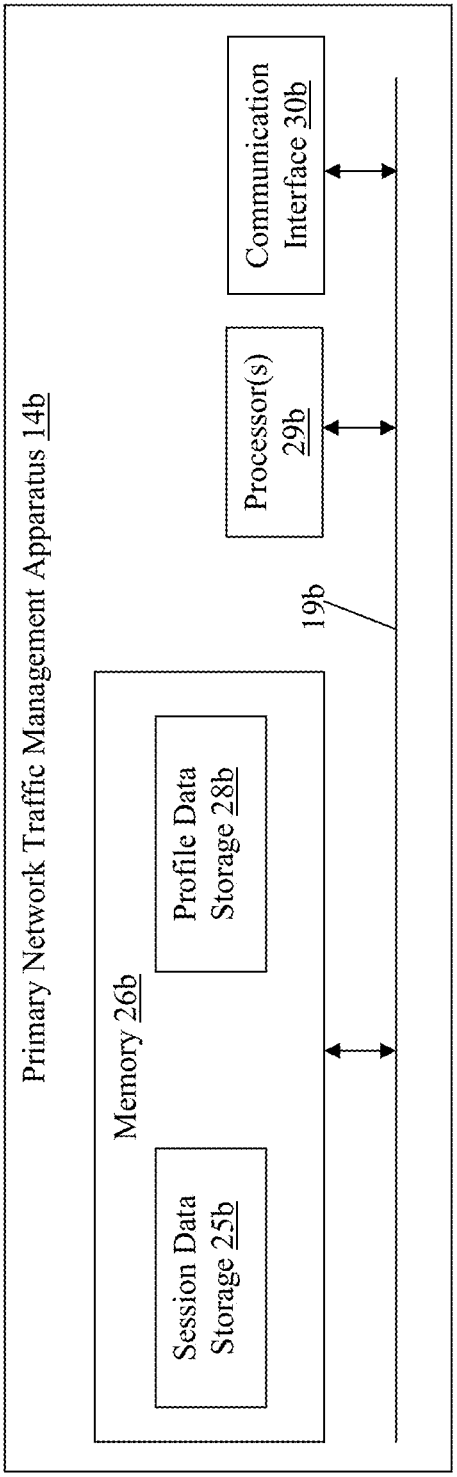
FIGS. 4A-4B is a block diagram of an exemplary primary network traffic management apparatus and a secondary network traffic management apparatus.
Figure 4B:
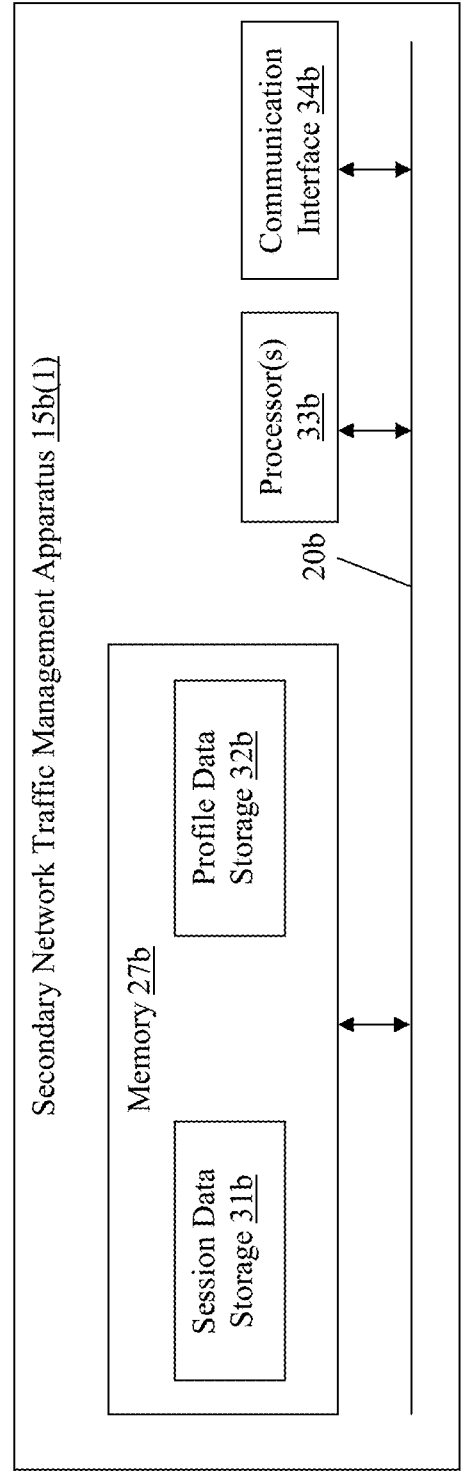

Referring to FIG. 3 and FIGS. 4A-4B, the primary network traffic management apparatus 14b of the network traffic management system 11 may perform any number of functions including migrating sessions between devices, managing network traffic, load balancing network traffic across the communication network 18b, global load balancing network traffic, identifying potential security threats to the network traffic, accelerating network traffic associated with web applications hosted by the remote server devices 17(1)-17(n). The primary network traffic management apparatus 14b of FIG. 4A in this example includes one or more processors 29b, a memory 26b, and/or a communication interface 30b, which are coupled together by a bus 19b or other communication link, although the primary network traffic management apparatus 14b can include other types and/or numbers of elements in other configurations.

The processor(s) 29b of the primary network traffic management apparatus 14b may execute programmed instructions stored in the memory 26b of the primary network traffic management apparatus 14b for the any number of the functions identified above. The processor(s) 29b of the primary network traffic management apparatus 14b may include one or more CPUs or general purpose processors with one or more processing cores, for example, although other types of processor(s) can also be used.

The memory 26b of the primary network traffic management apparatus 14b stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 29b, can be used for the memory 26b.

Figure 7:
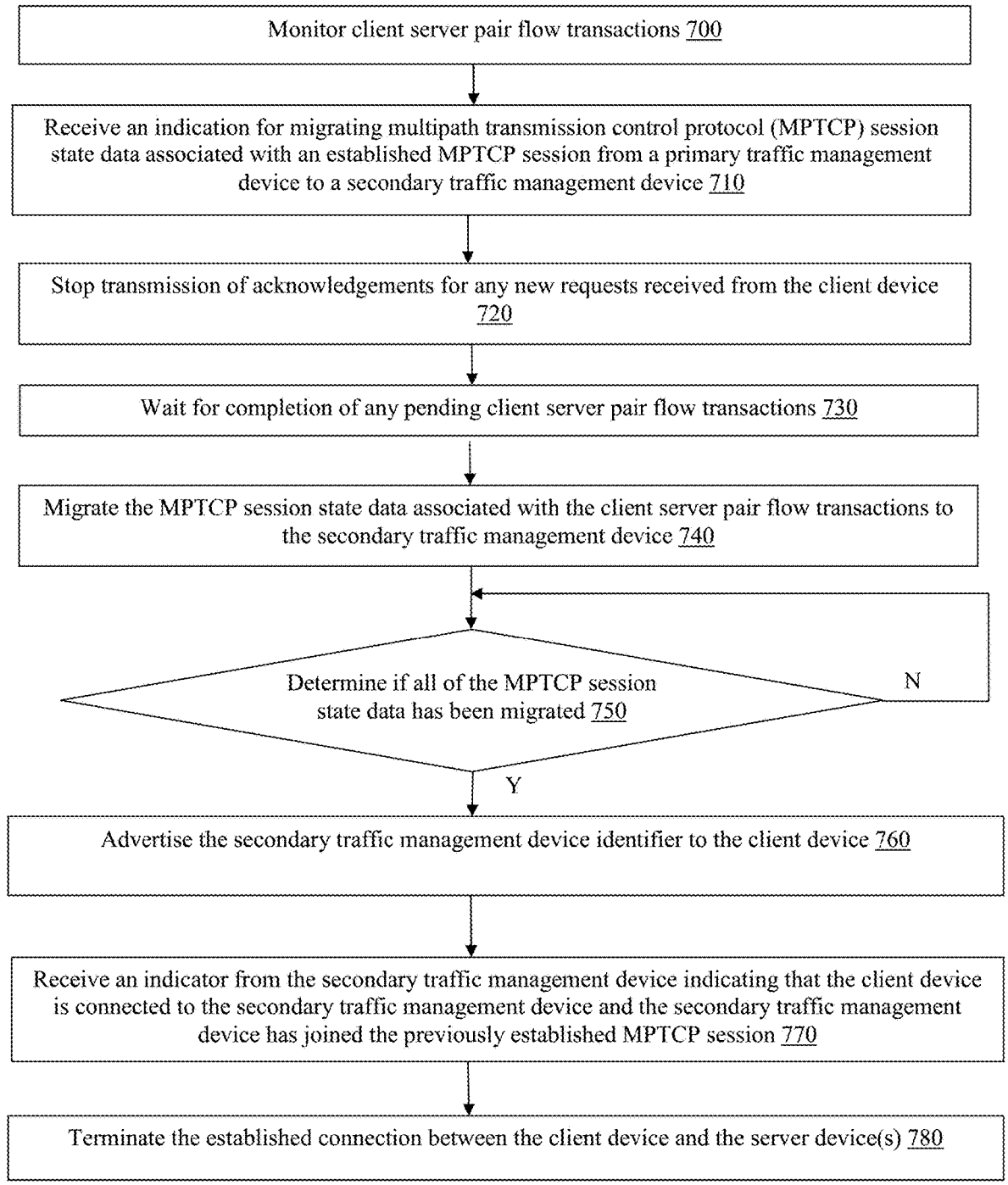
FIG. 7 is a flowchart of an exemplary method for exemplary network traffic management system with a primary network traffic management apparatus, a plurality of secondary network traffic management apparatus and remote server device pool of FIG. 3.

Accordingly, the memory 26b of the primary network traffic management apparatus 14b can store one or more applications that can include computer executable instructions that, when executed by the primary network traffic management apparatus 14b, cause the primary network traffic management apparatus 14b to perform actions, such as to transmit, receive, or otherwise process messages, for example, and to perform other actions described and illustrated below with reference to FIGS. 7-8. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the primary network traffic management apparatus 14b itself, may be located in virtual server(s) running in a cloud-based computing environment rather than being tied to one or more specific physical network computing devices. Also, the application(s) may be running in one or more virtual machines (VMs) executing on the network traffic management apparatus. Additionally, in one or more embodiments of this technology, virtual machine(s) running on the primary network traffic management apparatus 14b may be managed or supervised by a hypervisor.

In this particular example, the memory 26b of the primary network traffic management apparatus 14b includes session data storage 25b and profile data storage 28b, although the memory can include other types and/or numbers of policies, modules, databases, applications, and/or other data for example.

The session data storage 25a may store information associated with tracking a request response pair session associated between the client devices 16b(1)-16b(n) and the primary traffic management apparatus 14b. The request response pair session may correspond to flow transactions performed between a client device and a server device forming a client-server pair flow transactions. The flow transactions may include information about accessing by the client devices 16b(1)-16b(n) content at the primary traffic management apparatus 14b to form a session. The session data storage 25b information may also be used to determine when a session is completely migrated to an another device. By way of example, the another device may include the secondary traffic management apparatus 15b(1)-15b(n).

The profile data storage 28b may store information associated with server load, server location, and/or monitoring user traffic data, although other types of data may be stored. The server load may include, for example, information associated with load capacity of the server and/or the peak load capacity of the server. The stored information may include other information, for example information on which of the client device 16b(1)-16b(n) accesses which of the server devices 17(1)-17(n) at which location over a period of time. The stored information may also identify the one of the secondary network traffic management apparatus 15b(1)-15b(n) as a home server device for one of the client devices 16b(1)-16b(n), based on a determination that the one of the client devices 16b(1)-16b(n) accesses one of the secondary network traffic management apparatus 15b(1)-15b(n) regularly. Further, the stored information may also identify one of the secondary network traffic management apparatus 15b(1)-15b(n) as an away server device for one of the client devices 16b(1)-16b(n), based on determining that the one of the client devices 16b(1)-16b(n) does not access the one of the secondary network traffic management apparatus 15b(1)-15b(n) regularly, although other manners for determining home and/or away server devices for one or more client devices 16b(1)-16b(n) may be used. The stored information may also include user traffic data associated with the client device such as, tracked historical session information associated with the client devices 16b(1)-16b(n) over a period of time, although other type of information may be stored. The tracked historical information may include tracked information on various user activity, such as frequency of accessing websites by the client devices 16b(1)-16b(n), types of activity associated with the websites, historical shopping activity, and/or network activity any other activities in association with websites by way of example. The stored information may or may not identify one of the client devices 16b(1)-16b(n) as a known client device and/or may or may not store a classification of the one of the client devices 16b(1)-16b(n) as a safe device based on any identified security threat associated with that one of the client devices 16b(1)-16b(n). Further the stored information may identify the primary network traffic management apparatus 14b that will best service a request based on the location and historical information associated with the client devices 16b(1)-16b(n) as explained below.

Referring back to FIG. 3 and FIGS. 4A-4B, the communication interface 30b of the network traffic management apparatus operatively couples and communicates between the primary network traffic management apparatus 14b, the plurality of secondary network traffic management apparatus 15b(1)-15b(n), the remote server devices 17(1)-17(n), and/or the client devices 16b(1)-16b(n), which are all coupled together by the communication network(s) 18b, although other types and/or numbers of communication networks or systems with other types and/or numbers of connections and/or configurations to other devices and/or elements can also be used.

By way of example only, the communication network(s) 18b can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18b in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the primary network traffic management apparatus 14b is illustrated in this example as a including a single device, the primary network traffic management apparatus 14b in other examples can include one or more of the secondary server devices 15a(1)-15a(n). While each of the primary network traffic management apparatus 14b, the plurality of secondary network traffic management apparatus 15b(1)-15b(n), and the remote server devices 17(1)-17(n) is illustrated in this example as including a single device, the primary network traffic management apparatus 14b and the secondary network traffic management apparatus 15b(1)-15b(n) in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the primary network traffic management apparatus 14b. Although the primary network traffic management apparatus 14b is illustrated as single device, there may be one or more primary network traffic management apparatus 14b connected to one or more secondary network traffic management apparatus 15b(1)-15b(n).

Additionally, one or more of the devices that together comprise the primary network traffic management apparatus 14b in other examples can be standalone devices or integrated with one or more other devices or apparatuses, such as one of the server devices, for example. Moreover, one or more of the devices of the network traffic management apparatus 14b in these examples can be in a same or a different communication network including one or more public, private, or cloud networks, for example.

Each of the remote server devices 17(1)-17(n) in the remote server device pool of the network traffic management system 11 in this example includes one or more processors, a memory, and a communication interface, which are coupled together by a bus or other communication link, although other numbers and/or types of network devices could be used. The remote server devices 17(1)-17(n) in this example process requests received from the client devices 16b(1)-16b(n) via the communication network(s) 18b according to the HTTP-based application RFC protocol, for example. Various applications may be operating on the remote server devices 17(1)-17(n) and transmitting data (e.g., files or web pages) to the client devices 16b(1)-16b(n) via the primary network traffic management apparatus 14b in response to requests from the client devices 16b(1)-16b(n). The remote server devices 17(1)-17(n) may be hardware or software or may represent a system with multiple servers in a pool, which may include internal or external networks.

Although the remote server devices 17(1)-17(n) are illustrated as single devices, one or more actions of each of the remote server devices 17(1)-17(n) may be distributed across one or more distinct network computing devices that together comprise one or more of the remote server devices 17(1)-17(n). Moreover, the remote server devices 17(1)-17(n) are not limited to a particular configuration. Thus, the remote server devices 17(1)-17(n) may contain a plurality of network computing devices that operate using a master/slave approach, whereby one of the network computing devices of the remote server devices 17(1)-17(n) operate to manage and/or otherwise coordinate operations of the other network computing devices. The remote server devices 17(1)-17(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the remote server devices 17(1)-17(n) can operate within the primary network traffic management apparatus 14b itself rather than as a stand-alone server device communicating with the primary network traffic management apparatus 14b via the communication network(s) 18b. In this example, the one or more remote server devices 17(1)-17(n) operate within the memory 26b of the primary network traffic management apparatus 14b.

The client devices 16b(1)-16b(n) of the network traffic management system 11 in this example include any type of computing device that can receive, render, and facilitate user interaction with a webtop, such as mobile computing devices, desktop computing devices, laptop computing devices, tablet computing devices, virtual machines (including cloud-based computers), or the like. Each of the client devices 16b(1)-16b(n) in this example includes a processor, a memory, and a communication interface, which are coupled together by a bus or other communication link, although other numbers and/or types of network devices could be used.

The client devices 16b(1)-16b(n) may run interface applications, such as standard web browsers or standalone client applications, which may provide an interface to make requests for, and receive content stored on, one or more of the primary network traffic management apparatus 14b, the secondary network traffic management apparatus 15b(1)-15b(n) via the communication network(s) 18a. The client devices 16b(1)-16b(n) may further include a display device, such as a display screen or touchscreen, and/or an input device, such as a keyboard for example. Additionally, one or more of the client devices 16b(1)-16b(n) can be configured to execute software code (e.g., JavaScript code within a web browser) in order to log client-side data and provide the logged data to the primary network traffic management apparatus 14b, as described and illustrated in more detail later.

Although the exemplary network traffic management system 11 with the primary network traffic management apparatus 14b, the plurality of secondary network traffic management apparatus 15b(1)-15b(n), the remote server devices 17(1)-17(n), the client devices 16b(1)-16b(n), and communication network(s) 18b are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 11, such as the primary network traffic management apparatus 14b, the plurality of secondary network traffic management apparatus 15b(1)-15b(n), the remote server devices 17(1)-17(n) or the client devices 16b(1)-16b(n), for example, may be configured to operate as virtual instances on the same physical machine. In other words, one or more of the primary network traffic management apparatus 14b, client devices 16b(1)-16b(n), or the remote server devices 17(1)-17(n) may operate on the same physical device rather than as separate devices communicating through communication network(s) 18b. Additionally, there may be more or fewer the primary network traffic management apparatus 14b, the plurality of secondary network traffic management apparatus 15b(1)-15b(n), the remote server devices 17(1)-17(n) or the client devices 16b(1)-16b(n) than illustrated in FIG. 3.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Further, the configuration of the secondary network traffic management apparatus 15b(1)-15b(n) is similar to the primary network traffic management apparatus 14b. Referring to FIG. 4B, the secondary network traffic management apparatus 15b(1) of the network traffic management system 11 may perform any number of functions including migrating sessions between devices, managing network traffic, load balancing network traffic across the server devices, global load balancing network traffic, identifying potential security threats to the network traffic, accelerating network traffic associated with web applications hosted by the server devices. By way of example, one of the plurality of secondary network traffic management apparatus 15b(1)-15b(n) is show in FIG. 4B. In this example, the secondary network traffic management apparatus 15b(1) of FIG. 4B includes one or more processors 29b, a memory 26b, and/or a communication interface 30b, which are coupled together by a bus 19b or other communication link, although the primary network traffic management apparatus 14b can include other types and/or numbers of elements in other configurations. Further, the configurations of the each of the secondary network traffic management apparatus 15b(1)-15b(n) is similar to the primary network traffic management apparatus 14b as explained above.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of multipath transmission control protocol (MPTCP) based session migration and devices will now be described with reference to FIGS. 3-4, 7-8. Referring more specifically to FIG. 7, in a first step 700 in this example, the primary computing device of the network traffic management system 11 monitors client-server pair flow transactions between the client device 16b(1)-16b(n) and one or more remote server devices 17(1)-17(n) over an established connection. By way of example, the primary computing device in this example is the primary network traffic management apparatus 14*b* of FIG. 3, although the primary computing device could be any other device. By way of example, a client device 16*b*(1) sends a SYN request including a MPTCP connection request to the primary network traffic management apparatus 14*b*. In response to the SYN request the primary network traffic management apparatus 14*b* sends a transmit SYN acknowledgement message to acknowledge receiving the SYN request to the client device 16*b*(1). Upon receiving the SYN acknowledgment the primary network traffic management apparatus 14*b* and the client device 16*b*(1) establishes a first MPTCP session and exchanges MPTCP session data between them. Further, the primary network traffic management apparatus 14*b* receives from the client device 16*b*(1) a client access request to access applications at one or more of the remote server devices 17(1)-17(*n*). Upon receiving the client access request the primary network traffic management apparatus 14*b* transmits to the client device 16*b*(1) an acknowledgment for the client access request, to acknowledge receiving of the client access request. The primary network traffic management apparatus 14*b* then forwards the client access request to the one or more remote server devices 17(1)-17(*n*) associated with servicing the request. The primary network traffic management apparatus 14*b* then receives a server response from the one or more remote server devices 17(1)-17(*n*) granting access to the application content requested by the client device 16*b*(1). The primary network traffic management apparatus 14*b* then sends the server response to the client device 16*b*(1) and the client device 16*b*(1) then accesses the one or more remote server devices 17(1)-17(*n*) and thus establishing a first connection to transmit and receive content. The primary network traffic management apparatus 14*b* manages the first connection by monitoring and storing monitors and stores session information associated with tracking a request response pair session associated between the client device 16*b*(1) and one or more of the remote server devices 17(1)-17(*n*) in the session data storage 25*b*. This session information may include MPTCP session data exchanged between the client devices 16*b*(1) and the primary network traffic management apparatus 14*b*, and further may also include MPTCP session data exchanged between the primary network traffic management apparatus 14*b* and the one or more remote server devices 17(1)-17(*n*). The request response pair session corresponds to flow transactions performed between the client device 16*b*(1) and the remote server devices 17(1)-17(*n*) forming a client-server pair flow transactions. Further, the flow transactions may include accessing by the client device 16*b*(1) content at the remote server devices 17(1)-17(*n*) to form a session.

In step 710, the primary network traffic management apparatus 14*b* of the network traffic management system 11 receives an indication for migrating multipath transmission control protocol (MPTCP) session state data associated with the client-server pair flow transactions between the client device 16*b*(1) and the remote server devices 17(1)-17(*n*) to one or more of the secondary computing devices. By way of example, the one or more secondary computing devices in this example are the one or more secondary network traffic management apparatus 15*b*(1)-15*b*(*n*) in the secondary network traffic management apparatus pool of FIG. 1, although the secondary computing could be any other device. In this example, the primary computing device is the primary network traffic management apparatus 14*b* and the one or more secondary computing devices are the one or more secondary network traffic management apparatus 15*b*(1)-15*b*(*n*).

Receiving the indication may include, for example, receiving the indication automatically based on predefined policies. The predefined polices associated with automatically receiving an indication for migrating the MPTCP sessions may include migration policies stored in the profile data storage 28*b*. The primary network traffic management apparatus 14*b* analyzes the migration policies to determine corresponding actions associated with those migration policies.

The migration policies include analyzing the client-server pair flow transactions between the client device 16*b*(1) and the remote server devices 17(1)-17(*n*) serviced by the primary network traffic management apparatus 14*b* to determine the type of content within the client-server pair flow transactions. When the type of content is determined to be a potential malicious content or a potential security threat, then the migration policy would migrate the client-server pair flow transactions between the client device 16*b*(1) and the remote server devices 17(1)-17(*n*) serviced by the primary network traffic management apparatus 14*b* to the secondary network traffic management apparatus 15*b*(1) acting as an authentication entity and dedicated to handle that type of content. In this example, the secondary network traffic management apparatus 15*b*(1) is dedicated to handle these threats which may include, for example, a DOS attack, viruses or any malicious content. In another example, the client-server pair flow transactions between the client device 16*b*(1) and the remote server devices 17(1)-17(*n*) serviced by the primary network traffic management apparatus 14*b* can be migrated to a plurality of secondary network traffic management apparatus 15*b*(1)-15*b*(*n*).

By way of example, there are various ways to receive an indication for migrating the MPTCP session state data, for example, based on a user selection at a user interface or automatically based predefined polices associated with the network traffic. The session state data may include, for example, requests, responses, session protocol information and any information in relation to the client-server pair transactions. Further receiving the indication may include, receiving an indication based on a user selection at a user interface, for example, from an administrator associated with managing the network traffic. When the administrator wants to offline the primary network traffic management apparatus 14*b* for maintenance purposes, the administrator may use a user interface to provide the indication. For example, when it is determined by the primary network traffic management apparatus 14*b* that primary network traffic management apparatus 14*b* accessed by the client device 16*b*(1) is an away service device and then the action associated with a migration policy is that, this session is to be transmitted and handled by one or more of the secondary network traffic management apparatus 15*b*(1)-15*b*(*n*) that is a home service device. The home service device is a device accessed by the client device 16*b*(1) on a frequent basis over a period of time and an away server device is a device accessed by the client device 16*b*(1) for the first time or less frequently. Further, in another example, when it is determined that the primary network traffic management apparatus 14*b* servicing a request for the client device 16*b*(1) has a long lived session, and has reached its maximum peak load capacity or based on a pre determined load capacity limit then the action with another migration policy is that the session is to be handled by one or more of the secondary network traffic management apparatus 15*b*(1)-15*b*(*n*) that is capable to service the request. Further based on determining that the client device 16*b*(1) requesting the content is a potential security threat based on monitoring historical information associated with the client device 16*b*(1), or the client device 16(*b*) is accessing one or more remote server devices 17(1)-17(*n*) for the first time or any unusual activity associated with the client device 16*b*(1), then the action associated with the migration policy determines that the client device 16*b*(1) to be transferred to be handled by a secondary network traffic management apparatus 15*b*(1)-15*b*(*n*) acting as an authentication server. Although other types of policies and ways may be implemented for receiving the indication for migrating a MPTCP session data.

In step 720, the primary network traffic management apparatus 14*b* of the network traffic management system 11 stops transmission of acknowledgments for any new request received from the client device 16*b*(1). The primary network traffic management apparatus 14*b* may keep on receiving new client requests from the client device 16*b*(1) to access the one or more remote server devices 17(1)-17(*n*). However, the primary network traffic management apparatus 14*b* stops sending acknowledgments for the new client requests received the client device 16*b*(1) upon receiving an indication to migrate the MPTCP session state data.

In step 730, the primary network traffic management apparatus 14*b* of the network traffic management system 11 waits for completion of any pending client-server pair flow transactions. The primary network traffic management apparatus 14*b* determines for the first connection established between the client device 16*b*(1) and the one or more remote server devices 17(1)-17(*n*) as having transactions that are in progress and are pending. In this example the primary network traffic management apparatus 14*b* waits for all the pending transactions to be processed. Proceeding with migrating the session state data without processing the pending transactions would be problematic because the pending transactions would be left stuck in the first connection and could not be migrated. Accordingly, if there were pending transactions during migration, the migrated data would be incomplete with missing information, for example, missing response/request, only including a beginning of a response/request, only including a middle of the response/request or only including an ending of a response/request. As a result to avoid these issues the primary network traffic management apparatus 14*b* waits before initiating any migration of the session until all of the pending transactions have been completed between the client device and the server device(s).

In step 740, the primary network traffic management apparatus 14*b* of the network traffic management system 11 migrates the MPTCP session state data associated with the client-server pair flow transactions to one of the secondary server devices 15*b*(1)-15*b*(*n*). By way of example, the secondary network traffic management apparatus 15*b*(1) is the one of the secondary network traffic management apparatus 15*b*(1)-15*b*(*n*) that the MPTCP session state data is migrated to, by the primary server device 14*a* although the MPTCP session state data may be migrated any of the secondary network traffic management apparatus 15*b*(1)-15*b*(*n*).

The migration of the MPTCP session state data associated with the client-server pair flow transactions to the secondary network traffic management apparatus 15*b*(1) is initiated upon determining that all of the pending client server pair flow transactions have been completed. The migration of the MPTCP session date to one or more secondary network traffic management apparatus 15*a*(1)-15*a*(*n*) is based on the indication received in step 710. When the indication received in step 710 is based on the type of content determined to be a potential malicious content or a potential security threat, then the migration policy would migrate the client-server pair flow transactions between the client device 16*b*(1) and the remote server devices 17(1)-17(*n*) serviced by the primary network traffic management apparatus 14*b* to the secondary network traffic management apparatus 15*b*(1) acting as an authentication entity and dedicated to handle that type of content. In this example, the secondary network traffic management apparatus 15*b*(1) is dedicated to handle these threats which may include, for example, a DOS attack, viruses or any malicious content.

By way of example when the indication received in step 710 is based on a determination that the session of the client-server pair flow transactions between the client device 16*b*(1) and the remote server devices 17(1)-17(*n*) serviced by the primary network traffic management apparatus 14*b* is a long lived session and that has reached its maximum peak load capacity or has reached a predetermined load capacity limit, then a determination is made that the session is to be handled by the secondary network traffic management apparatus 15*b*(1) that is capable of handling the traffic load, then the session is migrated to the secondary network traffic management apparatus 15*b*(1) that is capable of handling the traffic load. When the indication received in step 710 is based on determination that the client device 16*b*(1) could be potentially a malicious user or a potential security threat and that the session is to be handled by a secondary server device 15*b*(1) dedicated to handle threats, such as a DOS attack, viruses, or any malicious content by way of example, then the session is migrated to a secondary server device 15*b*(1) dedicated to handle threats such as a DOS attack, viruses or any malicious content, although other types of policies and ways may be implemented for migrating the MPTCP session data. With MPTCP migration the sockets used in the transport layer are switched from the primary server device 14*b* to the secondary server device 15*b*(1). As these sockets are in the transport layer, the application layer of the devices is not disturbed and they continue processing and servicing the requested content between the client device 16*b* and the secondary server device 15*b*(1). As a result the client device 16*b*(1) is not affected and keeps on receiving the requested data seamlessly without any discontinuity. In another example, the primary server device 14*b* of the network traffic management system 10 migrates the MPTCP session state data associated with the client-server pair flow transactions to a plurality of secondary server devices 15*b*(1)-15*b*(*n*).

In step 750, the primary network traffic management apparatus 14*b* of the network traffic management system 11 determines when all of the MPTCP session state data of the client-server pair flow transactions between the client device 16*b*(1) and the remote server devices 17(1)-17(*n*) serviced by the primary network traffic management apparatus 14*b* has been migrated to the secondary network traffic management apparatus 15*b*(1). The primary network traffic management apparatus moves to step 760 when it determines that all of the MPTCP session state data associated with the first connection between the client device 16*b*(1) and the remote server devices 17(1)-17(*n*) has been migrated to the secondary network traffic management apparatus 15*b*(1). If in step 750, the primary network traffic management apparatus 14*b* of the network traffic management system 11 determines all of the MPTCP session state data has not migrated, then the No branch is taken to continue the migration. If in step 750, the primary network traffic management apparatus 14*b* of the network traffic management system 11 determines all of the MPTCP session state data has been migrated, then the Yes branch is taken to step 760.

In step 760, the primary network traffic management apparatus 14*b* of the network traffic management system 11 advertises the identifier of the secondary traffic management apparatus 15*b*(1) to which the MPTCP session state data has been migrated to in step 750. The secondary traffic management apparatus 15*b*(1) identifier includes an IP address associated with the secondary traffic management apparatus 15*b*(1) or any type of identifier associated.

In step 770, the primary network traffic management apparatus 14*b* of the network traffic management system 11 receives an indicator from the secondary traffic management apparatus 15*b*(1) indicating that the client device 16*b* is connected to the remote server device 17(1)-17(*n*) and the secondary traffic management apparatus 15*b*(1) has joined the previously established MPTCP session. The received indicator indicating that the secondary traffic management apparatus 15*b*(1) utilizes the transmitted MPTCP session state data to connect with the server device (s) and further to join the MPTCP session previously established between the primary traffic management apparatus 14*b* and the remote server devices 17(1)-17(*n*). The indicator further indicates that the client device is now connected to the server device(s) via the secondary traffic management apparatus 15*b*(1) and transmitting data based on the previously established MPTCP session.

In step 780, once the primary network traffic management apparatus 14*b* of the network traffic management system 11 receives an indicator of step 780 from the second traffic management apparatus 15*b*(1), then the primary network traffic management apparatus 14*b* terminates the first connection between the client device 16*b*(1) and the remote server devices 17(1)-17(*n*).

Figure 8:
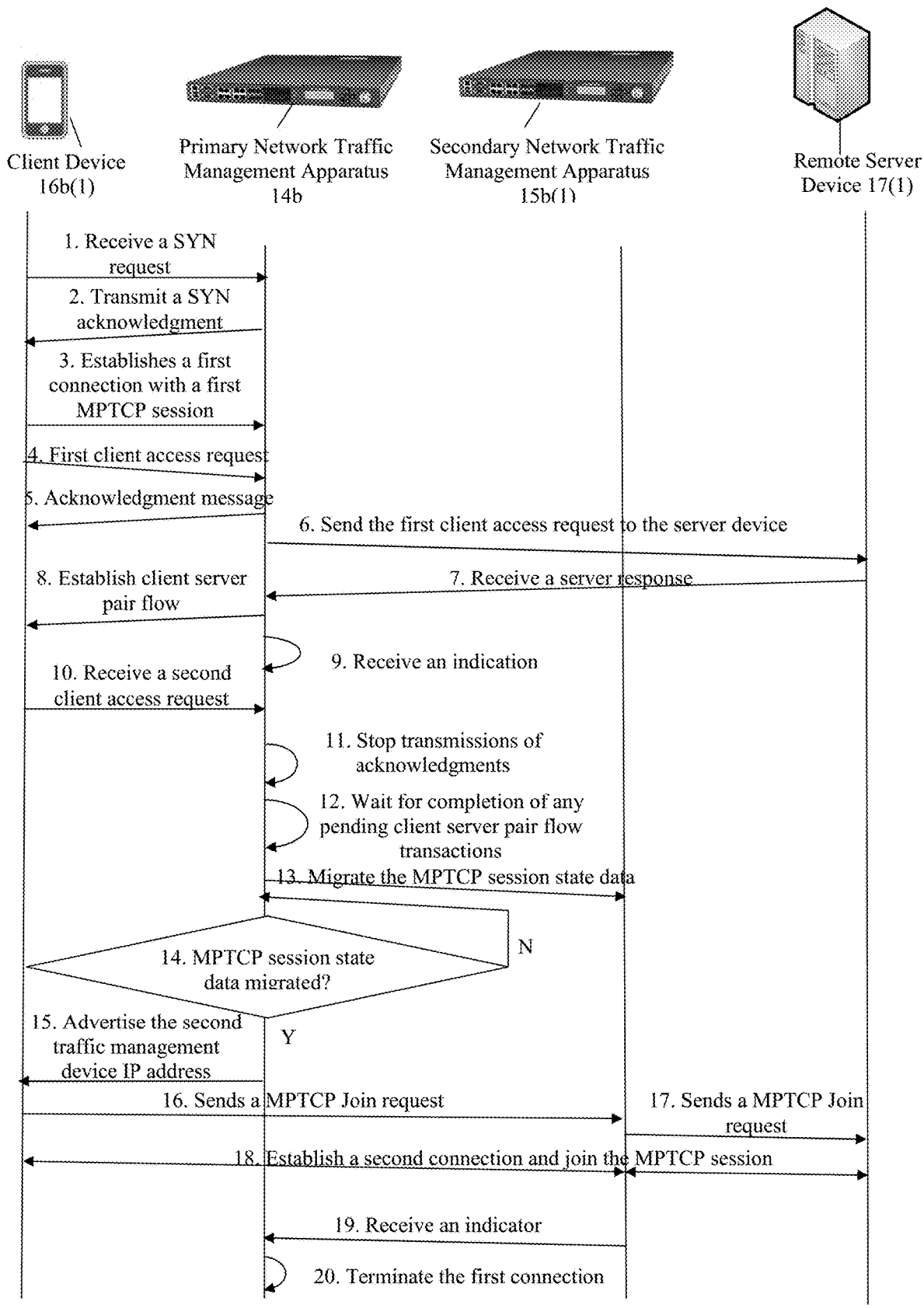
FIG. 8 is a timing diagram of an exemplary method for exemplary network traffic management system with a primary network traffic management apparatus, a plurality of secondary network traffic management apparatus and remote server device pool of FIG. 3.

Referring more specifically to FIG. 8, a timing diagram of an exemplary method of is illustrated. In a first step 1 in this example, the client device 16*b*(1) sends a SYN request including a MPTCP connection request to the primary network traffic management apparatus 14*b* to establish a connection with the remote server device 17 (1). The primary network traffic management apparatus 14*b* of the network traffic management system 11 receives the SYN request.

In step 2, the primary network traffic management apparatus 14*b* of the network traffic management system 11 in response to receiving the SYN request from the client device 16*b*(1) sends a transmit SYN acknowledgement message to acknowledge receiving the SYN request to the client device 16*b*(1).

In step 3, the primary network traffic management apparatus 14*b* of the network traffic management system 11 establishes a first MPTCP session. Upon receiving the SYN acknowledgment the primary network traffic management apparatus 14*b* and the client device 16*b*(1) establishes a first MPTCP session and exchanges MPTCP session data between them.

In step 4, the primary network traffic management apparatus 14*b* of the network traffic management system 11 receives a first client access request to access applications at the remote server device 17(1). The first client access request is to access application content at the remote server device 17(1).

In step 5, the primary network traffic management apparatus 14*b* of the network traffic management system 11 transmits an acknowledgment message in response. Upon receiving the client access request the primary network traffic management apparatus 14*b* transmits to the client device 16*b*(1) an acknowledgment for the client access request, to acknowledge receiving of the client access request.

In step 6, the primary network traffic management apparatus 14*b* of the network traffic management system 11 then forwards the first client access request to the remote server device 17(1) associated with servicing the request.

In step 7, the primary network traffic management apparatus 14*b* of the network traffic management system 11 then receives a server response from the remote server device 17(1) granting access to the application content requested by the client device 16*b*(1).

In step 8, the primary network traffic management apparatus 14*b* of the network traffic management system 11 then sends the server response to the client device 16*b*(1) and the client device 16*b*(1) then accesses the requested at the remote server device 17(1) and thus establishing a first connection to transmit and receive content and to complete a client-server pair flow transaction. The primary network traffic management apparatus 14*b* manages the first connection by monitoring and storing monitors and stores session information associated with tracking a request response pair session associated between the client device 16*b*(1) and the remote server device 17(1) in the session data storage 31*b*. This session information may include MPTCP session data exchanged between the client device 16*b*(1) and the primary network traffic management apparatus 14*b*, and further may also include MPTCP session data exchanged between the primary network traffic management apparatus 14*b* and the remote server device 17(1). The request response pair session corresponds to flow transactions performed between the client device 16*b*(1) and the remote server device 17(1) forming a client-server pair flow transactions. Further, the flow transactions may include accessing by the client device 16*b*(1) content at the remote server device 17(1) to form a session.

In step 9, the primary network traffic management apparatus 14*b* of the network traffic management system 11 receives an indication for migrating multipath transmission control protocol (MPTCP) session state data associated with the client-server pair flow transactions between the client device 16*b*(1) and the remote server devices 17(1)-17(*n*) to one or more of the secondary computing devices. By way of example, the one or more secondary computing devices in this example are the one or more secondary network traffic management apparatus 15*b*(1)-15*b*(*n*) in the secondary network traffic management apparatus pool of FIG. 1, although the secondary computing could be any other device. In this example, the primary computing device is the primary network traffic management apparatus 14*b* and the one or more secondary computing devices are the one or more secondary network traffic management apparatus 15*b*(1)-15*b*(*n*).

Receiving the indication may include, for example, receiving the indication automatically based on predefined policies. The predefined polices associated with automatically receiving an indication for migrating the MPTCP sessions may include migration policies stored in the profile data storage 28*b*. The primary network traffic management apparatus 14*b* analyzes the migration policies to determine corresponding actions associated with those migration policies.

The migration policies include analyzing the client-server pair flow transactions between the client device 16*b*(1) and the remote server devices 17(1)-17(*n*) serviced by the primary network traffic management apparatus 14*b* to determine the type of content within the client-server pair flow transactions. When the type of content is determined to be a potential malicious content or a potential security threat, then the migration policy would migrate the client-server pair flow transactions between the client device 16b(1) and the remote server devices 17(1)-17(n) serviced by the primary network traffic management apparatus 14b to the secondary network traffic management apparatus 15b(1) acting as an authentication entity and dedicated to handle that type of content. In this example, the secondary network traffic management apparatus 15b(1) is dedicated to handle these threats which may include, for example, a DOS attack, viruses or any malicious content. In another example, the client-server pair flow transactions between the client device 16b(1) and the remote server devices 17(1)-17(n) serviced by the primary network traffic management apparatus 14b can be migrated to a plurality of secondary network traffic management apparatus 15b(1)-15b(n).

By way of example, there are various ways to receive an indication for migrating the MPTCP session state data, for example, based on a user selection at a user interface or automatically based predefined polices associated with the network traffic. The session state data may include, for example, requests, responses, session protocol information and any information in relation to the client-server pair transactions. Further receiving the indication may include, receiving an indication based on a user selection at a user interface, for example, from an administrator associated with managing the network traffic. When the administrator wants to offline the primary network traffic management apparatus 14b for maintenance purposes, the administrator may use a user interface to provide the indication. For example, when it is determined by the primary network traffic management apparatus 14b that primary network traffic management apparatus 14b accessed by the client device 16b(1) is an away service device and then the action associated with a migration policy is that, this session is to be transmitted and handled by one or more of the secondary network traffic management apparatus 15b(1)-15b(n) that is a home service device. The home service device is a device accessed by the client device 16b(1) on a frequent basis over a period of time and an away server device is a device accessed by the client device 16b(1) for the first time or less frequently. Further, in another example, when it is determined that the primary network traffic management apparatus 14b servicing a request for the client device 16b(1) has a long lived session, and has reached its maximum peak load capacity or based on a pre determined load capacity limit then the action with another migration policy is that the session is to be handled by one or more of the secondary network traffic management apparatus 15b(1)-15b(n) that is capable to service the request. Further based on determining that the client device 16b(1) requesting the content is a potential security threat based on monitoring historical information associated with the client device 16b(1), or the client device 16(b) is accessing one or more remote server devices 17(1)-17(n) for the first time or any unusual activity associated with the client device 16b(1), then the action associated with the migration policy determines that the client device 16b(1) to be transferred to be handled by a secondary network traffic management apparatus 15b(1)-15b(n) acting as an authentication server. Although other types of policies and ways may be implemented for receiving the indication for migrating a MPTCP session data.

In step 10, the primary network traffic management apparatus 14b of the network traffic management system 11 stops transmission of acknowledgments for any new request received from the client device 16b(1). The primary network traffic management apparatus 14b may keep on receiving new client requests from the client device 16b(1) to access the one or more remote server devices 17(1)-17(n). However, the primary network traffic management apparatus 14b stops sending acknowledgments for the new client requests received the client device 16b(1) upon receiving an indication to migrate the MPTCP session state data.

In step 11, the primary network traffic management apparatus 14b of the network traffic management system 11 waits for completion of any pending client-server pair flow transactions. The primary network traffic management apparatus 14b determines for the first connection established between the client device 16b(1) and the one or more remote server devices 17(1)-17(n) as having transactions that are in progress and are pending. In this example the primary network traffic management apparatus 14b waits for all the pending transactions to be processed. Proceeding with migrating the session state data without processing the pending transactions would be problematic because the pending transactions would be left stuck in the first connection and could not be migrated. Accordingly, if there were pending transactions during migration, the migrated data would be incomplete with missing information, for example, missing response/request, only including a beginning of a response/request, only including a middle of the response/request or only including an ending of a response/request. As a result to avoid these issues the primary network traffic management apparatus 14b waits before initiating any migration of the session until all of the pending transactions have been completed between the client device and the server device(s).

In step 12, the primary network traffic management apparatus 14b of the network traffic management system 11 waits for completion of any pending client-server pair flow transactions. The primary network traffic management apparatus 14b determines for the first connection established between the client device 16b(1) and the one or more remote server devices 17(1)-17(n) as having transactions that are in progress and are pending. In this example the primary network traffic management apparatus 14b waits for all the pending transactions to be processed. Proceeding with migrating the session state data without processing the pending transactions would be problematic because the pending transactions would be left stuck in the first connection and could not be migrated. Accordingly, if there were pending transactions during migration, the migrated data would be incomplete with missing information, for example, missing response/request, only including a beginning of a response/request, only including a middle of the response/request or only including an ending of a response/request. As a result to avoid these issues the primary network traffic management apparatus 14b waits before initiating any migration of the session until all of the pending transactions have been completed between the client device and the server device(s).

In step 13, the primary network traffic management apparatus 14b of the network traffic management system 11 migrates the MPTCP session state data associated with the client-server pair flow transactions to one of the secondary server devices 15b(1)-15b(n). By way of example, the secondary network traffic management apparatus 15b(1) is the one of the secondary network traffic management apparatus 15b(1)-15b(n) that the MPTCP session state data is migrated to, by the primary server device 14a although the MPTCP session state data may be migrated any of the secondary network traffic management apparatus 15b(1)-15b(n).

The migration of the MPTCP session state data associated with the client-server pair flow transactions to the secondary network traffic management apparatus 15b(1) is initiated upon determining that all of the pending client server pair flow transactions have been completed. The migration of the MPTCP session date to one or more secondary network traffic management apparatus 15a(1)-15a(n) is based on the indication received in step 710. When the indication received in step 710 is based on the type of content determined to be a potential malicious content or a potential security threat, then the migration policy would migrate the client-server pair flow transactions between the client device 16b(1) and the remote server devices 17(1)-17(n) serviced by the primary network traffic management apparatus 14b to the secondary network traffic management apparatus 15b(1) acting as an authentication entity and dedicated to handle that type of content. In this example, the secondary network traffic management apparatus 15b(1) is dedicated to handle these threats which may include, for example, a DOS attack, viruses or any malicious content.

By way of example when the indication received in step 710 is based on a determination that the session of the client-server pair flow transactions between the client device 16b(1) and the remote server devices 17(1)-17(n) serviced by the primary network traffic management apparatus 14b is a long lived session and that has reached its maximum peak load capacity or has reached a predetermined load capacity limit, then a determination is made that the session is to be handled by the secondary network traffic management apparatus 15b(1) that is capable of handling the traffic load, then the session is migrated to the secondary network traffic management apparatus 15b(1) that is capable of handling the traffic load. When the indication received in step 710 is based on determination that the client device 16b(1) could be potentially a malicious user or a potential security threat and that the session is to be handled by a secondary server device 15b(1) dedicated to handle threats, such as a DOS attack, viruses, or any malicious content by way of example, then the session is migrated to a secondary server device 15b(1) dedicated to handle threats such as a DOS attack, viruses or any malicious content, although other types of policies and ways may be implemented for migrating the MPTCP session data. With MPTCP migration the sockets used in the transport layer are switched from the primary server device 14b to the secondary server device 15b(1). As these sockets are in the transport layer, the application layer of the devices is not disturbed and they continue processing and servicing the requested content between the client device 16b and the secondary server device 15b(1). As a result the client device 16b(1) is not affected and keeps on receiving the requested data seamlessly without any discontinuity. In another example, the primary server device 14b of the network traffic management system 10 migrates the MPTCP session state data associated with the client-server pair flow transactions to a plurality of secondary server devices 15b(1)-15b(n).

In step 14, the primary network traffic management apparatus 14b of the network traffic management system 11 determines when all of the MPTCP session state data of the client-server pair flow transactions between the client device 16b(1) and the remote server devices 17(1)-17(n) serviced by the primary network traffic management apparatus 14b has been migrated to the secondary network traffic management apparatus 15b(1). The primary network traffic management apparatus moves to step 15 when it determines that all of the MPTCP session state data associated with the first connection between the client device 16b(1) and the remote server devices 17(1)-17(n) has been migrated to the secondary network traffic management apparatus 15b(1). If in step 14, the primary network traffic management apparatus 14b of the network traffic management system 11 determines all of the MPTCP session state data has not migrated, then the No branch is taken to continue the migration. If in step 14, the primary network traffic management apparatus 14b of the network traffic management system 11 determines all of the MPTCP session state data has been migrated, then the Yes branch is taken to step 15.

In step 15, the primary network traffic management apparatus 14b of the network traffic management system 11 advertises the identifier of the secondary traffic management apparatus 15b(1) to which the MPTCP session state data has been migrated to in step 13. The secondary traffic management apparatus 15b(1) identifier includes an IP address associated with the secondary traffic management apparatus 15b(1) or any type of identifier associated.

In step 16, the client device 16b(1) sends a MPTCP join request to establish a connection with the secondary network traffic management apparatus 15b(1). Upon receiving the MPTCP join request, the secondary network traffic management apparatus 15b(1) establishes a connection with the client device 16b(1).

In step 17, the secondary network traffic management apparatus 15b(1) sends a MPTCP join request to join the previously established MPTCP connection. The previously established MPTCP connection between the remote server device 17(1) associated with the client device 16b(1) requesting content.

In step 18, the client device 16b(1) and the remote server device 17(1) establish a second connection via the second network traffic management apparatus 15b(1) by joining to the previously established MPTCP session.

In step 19, receive an indicator from the secondary traffic management apparatus 15b(1) indicating that the client device 16b(1) is connected to the remote server 17(1) and the secondary traffic management apparatus 15b(1) has joined the previously established MPTCP session. The received indicator indicating that the secondary traffic management apparatus 15b(1) utilizes the transmitted MPTCP session state data to connect with the remote server device 17(1) and further to join the MPTCP session previously established between the primary traffic management apparatus 14b and the remote server device 17(1). The indicator further indicates that the client device 16b(1) is now connected to the remote server device 17(1) via the secondary traffic management apparatus 15b(1) and transmitting data based on the previously established MPTCP session In step 20, once the primary network traffic management apparatus 14b of the network traffic management system 11 receives an indicator of step 19 from the second traffic management apparatus 15b(1), then the primary network traffic management apparatus 14b terminates the first connection between the client device 16b(1) and the remote server device 17(1).

Advantageously this technology, provides an optimized process of transitioning a TCP connection from one device to another by using features of multipath transmission control protocol (MPTCP) to enable session migration. With MPTCP migration the sockets used in the transport layer are switched from the primary traffic management apparatus to the secondary traffic management apparatus. As these sockets are in the transport layer, the application layer of the devices is not disturbed and they continue processing and servicing the requested content between the client device and the one or more server devices without interruption. As a result the client device is not affected and keeps on receiving the requested data seamlessly without any discontinuity, this eliminates application faults.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for multipath transmission control protocol (MPTCP) based session migration implemented by a network traffic management system comprising one or more network traffic management apparatuses, administrator devices, client devices, or server devices, the method comprising:
    managing one or more client-server pair flow transactions between a client and a primary computing device over a first multipath transmission control protocol (MPTCP) session established over a first connection;
    receiving an indication for migrating MPTCP session state data associated with the first MPTCP session from the primary computing device to at least one of one or more secondary computing devices, wherein the received indication is in response to analysis of one or more migration policies determining a migration is needed to mitigate a network attack;
    migrating the MPTCP session state data associated with the first MPTCP session to the at least one of the secondary computing devices;
    advertising an identifier associated with the one of the one or more secondary computing devices to the client;
    receiving an indication from the one of the one or more secondary computing devices indicating that a second MPTCP session has been established between the client and the one of the one or more secondary computing devices; and
    terminating the established first connection between the client device and the primary computing device.

2. The method of claim 1, further comprising:
    analyzing the one or more client-server pair flow transactions between the client and the primary computing device to determine a type of content within the client-server pair flow transactions; and
    migrating the MPTCP session state data associated with the first MPTCP session to the one of the one or more secondary computing devices based on the determined type of content within the client-server pair flow transactions.

3. The method of claim 1, further comprising:
    stopping transmission of acknowledgments for any new requests received from the client upon receiving the indication for migration.

4. The method of claim 1, further comprising:
    waiting for completion of any of the one or more client-server pair flow transactions that are pending, before migrating the MPTCP session state data.

5. The method of claim 1, further comprising:
    determining when all of the MPTCP session state data have been migrated to the one of the one or more secondary computing devices; and
    terminating the established connection between the client and the one or more remote server devices when the determination indicates that all of the MPTCP session state has been migrated to the one of the one or more secondary computing devices.

6. A network traffic manager apparatus, comprising memory with programmed instructions stored thereon and one or more processors configured to be capable of executing the stored programmed instructions to:
    manage one or more client-server pair flow transactions between a client and a primary computing device over a first multipath transmission control protocol (MPTCP) session established over a first connection;
    receive an indication for migrating MPTCP session state data associated with the first MPTCP session from the primary computing device to at least one of one or more secondary computing devices, wherein the received indication is in response to analysis of one or more migration policies determining a migration is needed to mitigate a network attack;
    migrate the MPTCP session state data associated with the first MPTCP session to the at least one of the secondary computing devices;
    advertise an identifier associated with the one of the one or more secondary computing devices to the client;
    receive an indication from the one of the one or more secondary computing devices indicating that a second MPTCP session has been established between the client and the one of the one or more secondary computing devices; and
    terminate the established first connection between the client device and the primary computing device.

7. The apparatus of claim 6, wherein the one or more processors are further configured to be capable of executing the stored programmed instructions to:
    analyze the one or more client-server pair flow transactions between the client and the primary computing device to determine a type of content within the client-server pair flow transactions; and
    migrate the MPTCP session state data associated with the first MPTCP session to the one of the one or more secondary computing devices based on the determined type of content within the client-server pair flow transactions.

8. The apparatus of claim 6, wherein the one or more processors are further configured to be capable of executing the stored programmed instructions to:
    stop transmission of acknowledgments for any new requests received from the client upon receiving the indication for migration.

9. The apparatus of claim 6, wherein the one or more processors are further configured to be capable of executing the stored programmed instructions to:
    wait for completion of any of the one or more client-server pair flow transactions that are pending, before migrating the MPTCP session state data.

10. The apparatus of claim 6, wherein the one or more processors are further configured to be capable of executing the stored programmed instructions to:
    determine when all of the MPTCP session state data have been migrated to the one of the one or more secondary computing devices; and
    terminate the established connection between the client and the one or more remote server devices when the determination indicates that all of the MPTCP session state has been migrated to the one of the one or more secondary computing devices.

11. A non-transitory computer readable medium having stored thereon instructions for multipath transmission control protocol (MPTCP) based session migration comprising executable code that, when executed by one or more processors, causes the processors to:
- manage one or more client-server pair flow transactions between a client and a primary computing device over a first multipath transmission control protocol (MPTCP) session established over a first connection;
- receive an indication for migrating MPTCP session state data associated with the first MPTCP session from the primary computing device to at least one of one or more secondary computing devices, wherein the received indication is in response to analysis of one or more migration policies determining a migration is needed to mitigate a network attack;
- migrate the MPTCP session state data associated with the first MPTCP session to the at least one of the secondary computing devices;
- advertise an identifier associated with the one of the one or more secondary computing devices to the client;
- receive an indication from the one of the one or more secondary computing devices indicating that a second MPTCP session has been established between the client and the one of the one or more secondary computing devices; and
- terminate the established first connection between the client device and the primary computing device.

12. The non-transitory computer readable medium of claim 11, wherein the executable code when executed by the one or more processors further causes the one or more processors to:
- analyze the one or more client-server pair flow transactions between the client and the primary computing device to determine a type of content within the client-server pair flow transactions; and
- migrate the MPTCP session state data associated with the first MPTCP session to the one of the one or more secondary computing devices based on the determined type of content within the client-server pair flow transactions.

13. The non-transitory computer readable medium of claim 11, wherein the executable code when executed by the one or more processors further causes the one or more processors to:
- stop transmission of acknowledgments for any new requests received from the client upon receiving the indication for migration.

14. The non-transitory computer readable medium of claim 11, wherein the executable code when executed by the one or more processors further causes the one or more processors to:
- wait for completion of any of the one or more client-server pair flow transactions that are pending, before migrating the MPTCP session state data.

15. The non-transitory computer readable medium of claim 11, wherein the executable code when executed by the one or more processors further causes the one or more processors to:
- determine when all of the MPTCP session state data have been migrated to the one of the one or more secondary computing devices; and
- terminate the established connection between the client and the one or more remote server devices when the determination indicates that all of the MPTCP session state has been migrated to the one of the one or more secondary computing devices.

16. A network traffic management system comprising a memory with programmed instructions stored thereon for one or more primary computing modules, secondary computing modules, client modules, or remote server modules, and one or more processors configured to be capable of executing the stored programmed instructions to:
- manage one or more client-server pair flow transactions between a client and a primary computing device over a first multipath transmission control protocol (MPTCP) session established over a first connection;
- receive an indication for migrating MPTCP session state data associated with the first MPTCP session from the primary computing device to at least one of one or more secondary computing devices, wherein the received indication is in response to analysis of one or more migration policies determining a migration is needed to mitigate a network attack;
- migrate the MPTCP session state data associated with the first MPTCP session to the at least one of the secondary computing devices;
- advertise an identifier associated with the one of the one or more secondary computing devices to the client;
- receive an indication from the one of the one or more secondary computing devices indicating that a second MPTCP session has been established between the client and the one of the one or more secondary computing devices; and
- terminate the established first connection between the client device and the primary computing device.

17. The network traffic management system of claim 16, wherein the one or more processors are further configured to be capable of executing the stored programmed instructions to:
- analyze the one or more client-server pair flow transactions between the client and the primary computing device to determine a type of content within the client-server pair flow transactions; and
- migrate the MPTCP session state data associated with the first MPTCP session to the one of the one or more secondary computing devices based on the determined type of content within the client-server pair flow transactions.

18. The network traffic management system of claim 16, wherein the one or more processors are further configured to be capable of executing the stored programmed instructions to:
- stop transmission of acknowledgments for any new requests received from the client upon receiving the indication for migration.

19. The network traffic management system of claim 16, wherein the one or more processors are further configured to be capable of executing the stored programmed instructions to:
- wait for completion of any of the one or more client-server pair flow transactions that are pending, before migrating the MPTCP session state data.

20. The network traffic management system of claim 16, wherein the one or more processors are further configured to be capable of executing the stored programmed instructions to:
- determine when all of the MPTCP session state data have been migrated to the one of the one or more secondary computing devices; and terminate the established connection between the client and the one or more remote server devices when the indicates that all of the MPTCP session state has been migrated to the one of the one or more secondary computing devices.

\* \* \* \* \*